(12) United States Patent
Agrawal et al.

(10) Patent No.: US 9,648,474 B2
(45) Date of Patent: May 9, 2017

(54) EFFICIENTLY TRANSMITTING BULK DATA OVER A MOBILE NETWORK

(71) Applicants: Om P. Agrawal, Saskatoon (CA); Anita Agrawal, Saskatoon (CA)

(72) Inventors: Om P. Agrawal, Saskatoon (CA); Anita Agrawal, Saskatoon (CA)

(73) Assignee: Pangaea Digital LLC, Wilmington, DE (US)

(*) Notice: Subject to any disclaimer, the term of this patent is extended or adjusted under 35 U.S.C. 154(b) by 15 days.

(21) Appl. No.: 14/868,299

(22) Filed: Sep. 28, 2015

(65) Prior Publication Data
US 2016/0094961 A1    Mar. 31, 2016

Related U.S. Application Data

(60) Provisional application No. 62/056,363, filed on Sep. 26, 2014.

(51) Int. Cl.
*H04W 4/14* (2009.01)
*H04L 12/58* (2006.01)

(52) U.S. Cl.
CPC .............. *H04W 4/14* (2013.01); *H04L 51/34* (2013.01); *H04L 51/36* (2013.01)

(58) Field of Classification Search
CPC ..... H04W 4/24; H04M 15/83; G06Q 30/0267
See application file for complete search history.

(56) References Cited

U.S. PATENT DOCUMENTS

| 6,597,918 | B1* | 7/2003 | Kim | H04L 12/5835 370/236 |
| 2002/0062342 | A1* | 5/2002 | Sidles | G06F 17/243 709/203 |
| 2002/0107885 | A1* | 8/2002 | Brooks | G06F 3/04883 715/224 |
| 2005/0130628 | A1* | 6/2005 | Zom | G06F 17/243 455/412.1 |
| 2010/0261458 | A1* | 10/2010 | Del Gallo | G06F 3/03545 455/414.1 |
| 2012/0009954 | A1* | 1/2012 | Gadiraju | H04L 12/5895 455/466 |
| 2013/0225153 | A1* | 8/2013 | Kim | G05B 19/4185 455/419 |

(Continued)

*Primary Examiner* — Nathan Mitchell
(74) *Attorney, Agent, or Firm* — Lewis Roca Rothgerber Christie LLP

(57) ABSTRACT

A method for efficiently transmitting bulk data over a mobile network using predetermined fillable templates may include correlating records in a database with an input field of a predetermined fillable template and a report field of a predetermined report. The template may be provided to a user by way of a downloadable and executable mobile application. The method may include receiving discrete SMS messages populated into the input fields of the template by a user of a mobile device upon which the mobile application has been installed. The method may include associating each received SMS message with a corresponding report field of the predetermined report according. The method may include populating the corresponding report field of the predetermined report with report information based on the received SMS message. The method may also include providing the predetermined report to a computing device associated with a second user.

14 Claims, 16 Drawing Sheets

(56) References Cited

U.S. PATENT DOCUMENTS

2015/0172883 A1* 6/2015 Cili .................. H04W 4/14
                                                    455/466
2016/0044631 A1* 2/2016 Feder ............... H04W 68/00
                                                    455/458

* cited by examiner

– 1 –
EFFICIENTLY TRANSMITTING BULK DATA OVER A MOBILE NETWORK

CROSS-REFERENCE TO RELATED APPLICATION

The present application claims the priority benefit of U.S. provisional application No. 62/056,363 filed Sep. 26, 2015 and entitled "Efficiently Transmitting Bulk Data Over a Mobile Network," the disclosure of which is incorporated herein by reference.

BACKGROUND

1. Field of the Disclosure

The present disclosure relates to transmitting bulk data using a mobile device. More particularly, the present disclosure concerns systems and methods for efficiently transmitting bulk data over a mobile network using an executable mobile application that displays predetermined fillable templates and predetermined reports.

2. Description of the Related Art

The routine day-to-day activities of many industries depend on the ability of people to send and receive bulk information organized in preformatted forms or templates. In the healthcare sector, for instance, medical charts are used to collect diagnostic information about patients. In the construction industry, project managers regularly fill out and submit detailed progress reports to upper management. Today, many industries have abandoned traditional paper forms in favor of electronic forms with fillable fields, checkboxes, selectable pull-down menus, and other data entry options.

In many cases, sending and receiving these data-rich fillable forms presents only a minor obstacle due to the presence of a reliable Internet connection. In some situations, however—and particularly in remote geographies—a reliable Internet connection may be an unavailable luxury. A connection to a mobile network (also commonly referred to as a "cellular" network) may constitute the only telecommunications link available in the region. And yet, despite the lack of a reliable Internet connection, industries must find ways to send and receive organized bulk data in accordance with their normal business practices. Currently available tools for transmitting bulk data over mobile networks fall short in that respect.

Mobile networks permit the exchange of small data files known as "short messages" over Short Message Service (SMS). SMS is an internationally accepted wireless service that enables the transmission of alphanumeric messages between mobile subscribers and external systems such as electronic mail, paging, and voice mail systems. Short messages sent over SMS are commonly referred to as "SMS messages." The most prevalent use of SMS protocols is the sending of SMS messages between mobile phone users (e.g., smartphone users), a practice commonly referred to as "texting."

SMS utilizes a control channel that is normally used to transfer cellular connections and regulate the transfer of packets. As a result, an SMS-enabled mobile device can send and receive SMS messages without interrupting voice communications. SMS-based communication networks can include a variety of different hardware and/or software elements, including short messaging entities, short message service centers, SMS gateways, SMS gateways, and mobile switching centers. Short messaging entities may send or receive SMS messages and may be connected to fixed or mobile networks. Short message service centers are responsible for storing and relaying short messages between short message entities and mobile devices. SMS gateways function like a hub in an Ethernet network and serve as gateways to regular fixed-line networks. Mobile switching centers help to route data through a mobile network.

Although there are many benefits associated with SMS messages (e.g., fast transfer times and the fact that they do not interrupt voice communications), they are also handicapped in an important way—SMS messages are inherently limited when it comes to file size. As the name implies, SMS messages must be short in length. The maximum number of characters, including any letters, numbers, or symbols in the Latin alphabet, is 160. For other alphabets, such as Arabic, the maximum size is only 70 characters. As a result, in remote areas in which no reliable Internet connection is available, transmitting bulk data over a mobile network using SMS is problematic.

For instance, a clinic volunteer in a rural geography lacking an Internet connection could hardly rely on conventional SMS for transmitting a medical chart from the clinic to a consulting physician located in a developed region with more advanced healthcare services. Nor could a project manager overseeing a construction project in a remote area rely on SMS for sending a complex, data-rich progress report to upper management.

Given those limitations, current tools for transferring bulk data over a mobile network fall short of industry needs. Businesses and individuals alike need an improved way to efficiently send and receive bulk data over a mobile network.

SUMMARY OF THE CLAIMED INVENTION

Systems and methods for efficiently transmitting bulk data over a mobile network are claimed.

In a first claimed embodiment, a method of efficiently transmitting bulk data over a mobile network includes maintaining a database in memory of a server. The database includes a table storing records, each of which corresponds to one of several input fields arranged as a predetermined fillable template. Each record also corresponds to one of several report fields arranged as a predetermined report. The method includes providing the predetermined fillable template to a mobile device associated with a first user to be displayed on a user interface of the mobile device. The mobile device is communicatively coupled to the server by a mobile network and lacks a connection to a non-mobile communications network. The method includes receiving from the mobile device over the mobile network several short messages sent over Short Message Service (SMS). Each SMS message represents data inputted by the first user into one of the input fields of the predetermined fillable template. The method includes correlating each received SMS message with a report field of the predetermined report based on the record corresponding to the input field of the predetermined fillable template. The method further includes populating the predetermined report based on the determined correlation between each SMS message and each report field of the predetermined report. The method includes providing the predetermined report over a non-mobile communications network to a computing device associated with a second user to be displayed on a user interface of the computing device.

In a second claimed embodiment, a non-transitory computer-readable storage medium includes an executable computer program embodied on the medium. When executed by a processor of a computing device, the program performs a method of efficiently transmitting bulk data over a mobile network. The method includes maintaining a database in memory of a server. The database includes a table storing records, each of which corresponds to one of several input fields arranged as a predetermined fillable template. Each record also corresponds to one of several report fields arranged as a predetermined report. The method includes providing the predetermined fillable template to a mobile device associated with a first user to be displayed on a user interface of the mobile device. The mobile device is communicatively coupled to the server by a mobile network and lacks a connection to a non-mobile communications network. The method includes receiving from the mobile device over the mobile network several short messages sent over Short Message Service (SMS). Each SMS message represents data inputted by the first user into one of the input fields of the predetermined fillable template. The method includes correlating each received SMS message with a report field of the predetermined report based on the record corresponding to the input field of the predetermined fillable template. The method further includes populating the predetermined report based on the determined correlation between each SMS message and each report field of the predetermined report. The method includes providing the predetermined report over a non-mobile communications network to a computing device associated with a second user to be displayed on a user interface of the computing device.

In a third claimed embodiment, a bulk data transmission system may include a network interface, a memory, and a processor. The network interface communicates over a mobile network with a remote mobile device that lacks an Internet connection. Communicating with the remote mobile device includes receiving and sending a plurality of short messages sent over Short Message Service (SMS). The remote mobile device is associated with a first user. The memory stores executable instructions and a database of records. Each record corresponds to one of a plurality of input fields provided to a first user through a user interface displayed on the mobile device associated with the first user. The input fields are arranged as a predetermined fillable template and each record correspond to one of a plurality of alert fields provided to a second user through a user interface displayed on a computing device associated with the second user. The report fields are arranged as a predetermined report. Each SMS message represents data entered by the first user into one of the plurality of input fields of the predetermined fillable template provided to the first user through the user interface displayed on the mobile device associated with the first user. The processor executes the instructions stored in the memory. Upon executing the instructions, the system transmits the plurality of SMS messages to the computing device associated the second user. The SMS messages are populated into the report fields and displayed as the predetermined report to the second user through the user interface displayed on the computing device associated with the second user.

BRIEF DESCRIPTION OF DRAWINGS

FIGS. 6A through 6C illustrate various exemplary predetermined fillable templates within the context of the healthcare field.

DETAILED DESCRIPTION

Figure 1:
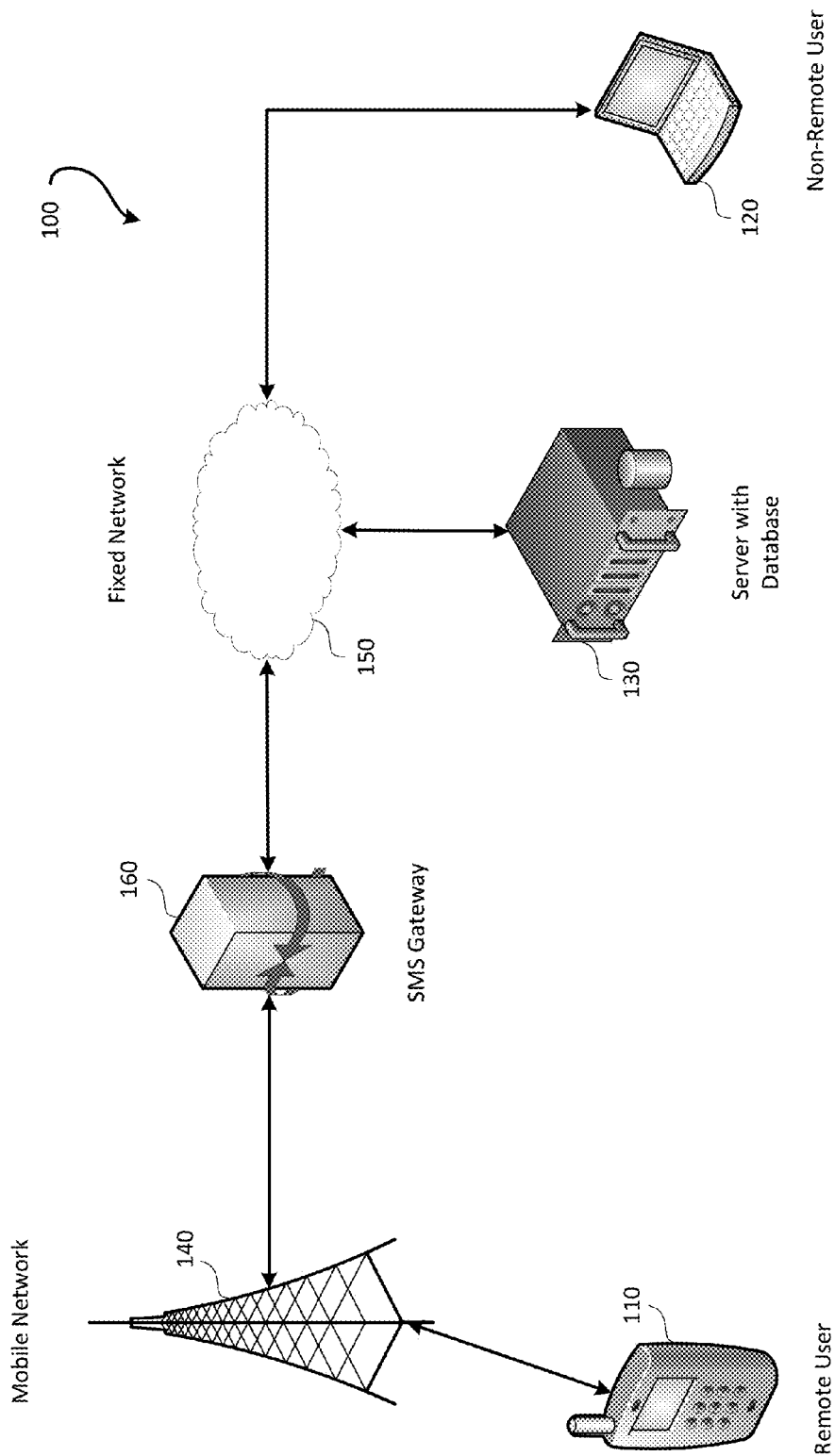
FIG. 1 illustrates an exemplary mobile network environment in which embodiments of systems and methods for transmitting bulk data over a mobile network may be implemented.

Systems and methods for efficiently transmitting bulk data over a mobile network are disclosed. Such systems and methods provide for the improved transmission of bulk data between a mobile device of a first user and a computing device of a second user. Such systems and methods are particularly useful when at least the mobile device of the first user cannot maintain an active Internet connection and must therefore rely on an available mobile network for transmitting the bulk data. The various embodiments described in this disclosure are exemplary in nature and were selected to most clearly convey the technological concepts. Such embodiments in no way constitute an exhaustive list of possible embodiments and they should not be construed as such. After reading the following description, persons of ordinary skill in the art will readily recognize that many other embodiments and variations are possible in light of the present disclosure. Moreover, although certain industry uses are described for illustrative purposes (e.g. the healthcare industry, the construction industry, etc.), the presently disclosed technology may be used for any industry application and the examples provided in this disclosure are in no way exhaustive.

A method of efficiently transmitting bulk data over a mobile network may include maintaining a database in memory of a server. The database may include a table storing a plurality of records. Each record may correspond to one of a plurality of input fields provided to a first user through a user interface displayed on a mobile device associated with the first user. The input fields may be arranged as a predetermined fillable template and each record may corresponds to one of a plurality of alert fields provided to a second user through a user interface displayed on a computing device associated with the second user. The report fields may be arranged as a predetermined report.

The method may further include receiving from the mobile device over a mobile network a plurality of short messages sent over Short Message Service (SMS). The mobile device may not have an active Internet connection and each SMS message may represents data entered by the first user into one of the plurality of input fields of the predetermined fillable template provided to the first user through the user interface displayed on the mobile device associated with the first user. The method may include sending the plurality of SMS messages to the computing device associated the second user. The SMS messages may be subsequently populated into the report fields and displayed as the predetermined report to the second user through the user interface displayed on the computing device associated with the second user. The method may include sending to the computing device associated with the second user an alert notifying the second user that the first user has transmitted bulk data over the mobile network by way of the predetermined report.

A non-transitory computer-readable storage media may have embodied thereon an executable computer program that, when executed by a processor, executes the foregoing method of efficiently transmitting bulk data over a mobile network.

A bulk data transmission system may include a mobile device used by a user in a remote geography with little or no access to the Internet. The system may further include a computing device used by a user in a developed geography with access to the Internet. The system may include a server that may maintain a database stored in memory. The mobile device, computing device, and server may communicate with one another through a combination of mobile networks and non-mobile or fixed networks, using SMS gateways or other hardware and software elements as appropriate based on the geographies at issue and network conditions in effect at the time of message transmission.

FIG. 1 illustrates an exemplary mobile network environment 100 in which embodiments of systems and methods for transmitting bulk data over a mobile network may be implemented. In one embodiment, the system may be implemented as a mobile network service. As discussed later, in some embodiments, the system may also be implemented as a network service using both mobile and non-mobile communications (e.g., networks connected to the Internet). The service may provide, through an executable mobile application, a series of graphical displays via a graphical user interface of a mobile device, examples of which are discussed with respect to FIGS. 4-7 and 9.

As shown in FIG. 1, an exemplary network environment 100 may include a mobile device 110. Mobile device 110 may be used by a user in a remote geography with little or no access to the Internet. Network environment 100 may include a computing device 120, which may be a mobile or non-mobile computing device. Computing device 120 may be used by a user whose device has access to the Internet (e.g., in a developed or "non-remote" geography). Network environment 100 may include a server or other computing device 130, which may maintain a database stored in memory. Mobile device 110, computing device 120, and server 130 may communicate with one another through a combination of mobile networks 140 and non-mobile or fixed networks 150, using SMS gateways 160 or other hardware and software elements (e.g., short message service centers) as appropriate based on the geographies at issue and network conditions in effect at the time of message transmission.

Fixed network 150 may be implemented as a private network, public network, WAN, LAN, an intranet, the Internet, or a combination of these or other networks. Mobile device 110 may be a smartphone, tablet, laptop, e-reader, personal digital assistant (PDA), or any other mobile device capable of accessing information over mobile network 140. Mobile device 110 may include one or more executable applications stored in memory that, when executed, permit a user to view content provided by a server over mobile network 120 or generated locally within mobile device 110. Server 130 may include one or more computing devices that provide a network service over mobile network 140. Computing device 140 may be a mobile device like mobile device 110 (e.g., a smartphone or laptop), or it may be a stationary computing device such as a desktop computer.

In various embodiments, various system functionalities described herein may be distributed to various degrees across a mobile device, server, one or more intermediate computing devices, or some combination of those or similar devices as appropriate based on the available computing and networking resources. Operating in the context of mobile environment 100, for instance, an exemplary bulk data transmission system may include one or more network interfaces, one or more memory devices, and one or more processors (e.g., within server 130 or distributed across one or more devices depicted in FIG. 1 and discussed above). The one or more network interfaces communicate over a mobile network with a remote mobile device that lacks an Internet connection (e.g., device 110 of FIG. 1). Communicating with the remote mobile device includes receiving and sending a plurality of short messages sent over Short Message Service (SMS). The remote mobile device is associated with a first user. The memory stores executable instructions and a database of records. Each record corresponds to one of a plurality of input fields provided to a first user through a user interface displayed on the mobile device associated with the first user. The input fields are arranged as a predetermined fillable template and each record correspond to one of a plurality of alert fields provided to a second user through a user interface displayed on a computing device associated with the second user (e.g., device 120 of FIG. 1). The report fields are arranged as a predetermined report. Each SMS message represents data entered by the first user into one of the plurality of input fields of the predetermined fillable template provided to the first user through the user interface displayed on the mobile device associated with the first user. At least one of the one or more processors executes the instructions stored in the one or more memory devices. Upon executing the instructions, the system transmits the plurality of SMS messages to the computing device associated the second user. The SMS messages are populated into the report fields and displayed as the predetermined report to the second user through the user interface displayed on the computing device associated with the second user.

Figure 2:
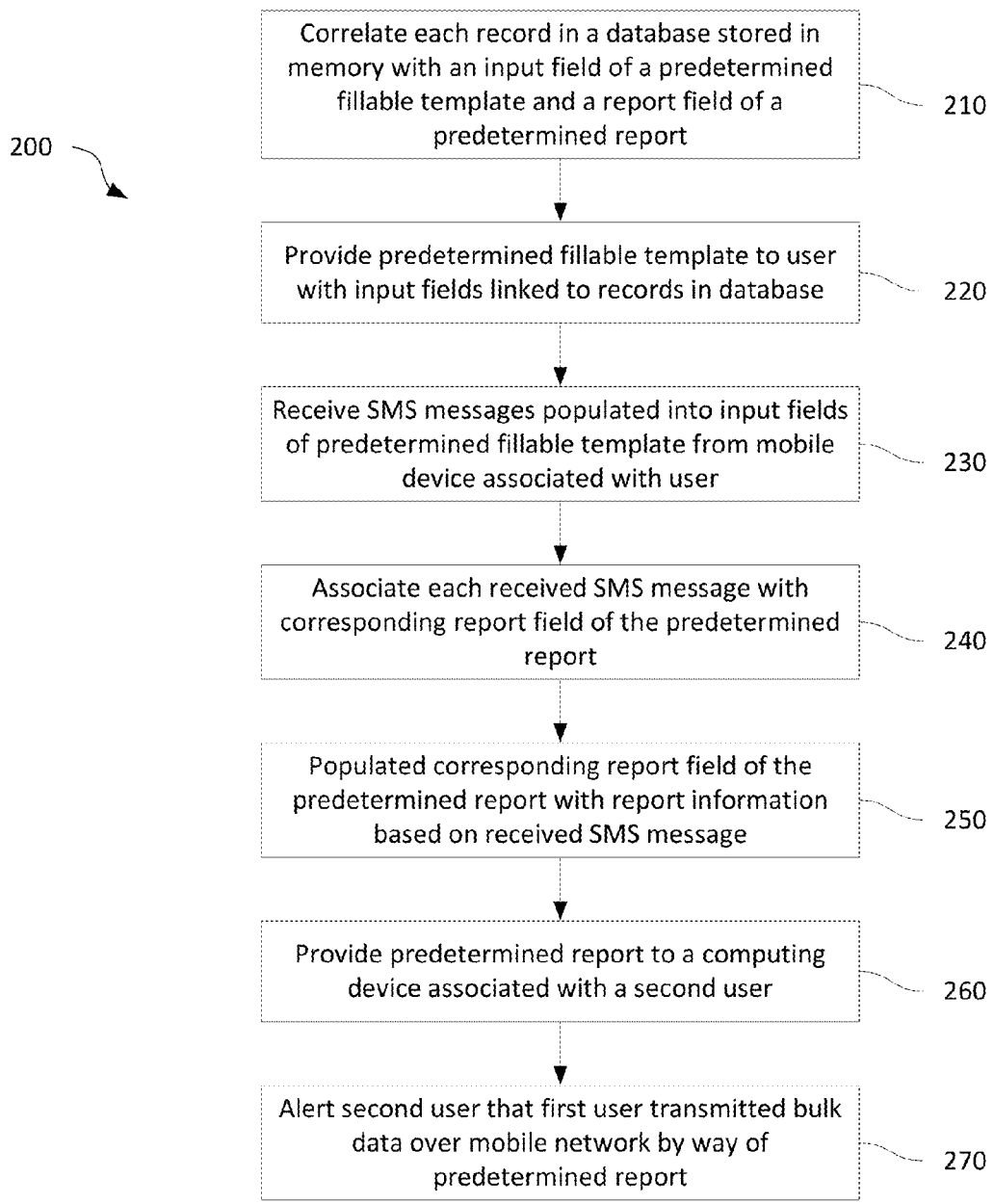
FIG. 2 illustrates an exemplary method of transmitting bulk data over a mobile network.

FIG. 2 illustrates an exemplary method 200 of transmitting bulk data over a mobile network. In one embodiment, the method may include maintaining a database in memory of a server, such as server 130 shown in FIG. 1. The database may be a relational database and may include a table storing a plurality of records. The organization of the records may be governed a predetermined relationship between a predetermined data template and a predetermined report. The predetermined data template may correspond to a predetermined report, either or both of which may be displayed on a graphical user interface of a mobile device or other computing device. In particular, the predetermined data template may correspond to the predetermined report such that any data entered by a user into the predetermined fillable template by way of a graphical user interface of a mobile device (e.g., mobile device 110 of FIG. 1) may be seamlessly stored in the table and subsequently populated into the predetermined report displayed on a user interface of a recipient computing device (e.g., computing device 120 of FIG. 1), which may itself be a mobile device in some embodiments.

As shown in FIG. 2 at step 210, in one exemplary embodiment, the foregoing relationship may be accomplished by correlating each record within the table to one of a plurality of input fields provided to a first user through a graphical user interface displayed on a mobile device associated with the first user. The input fields may be arranged as a predetermined fillable template and each record may further correspond to one of a plurality of report fields provided to a second user through a user interface displayed on a computing device associated with the second user. The predetermined fillable templates may be provided to the first user by way of a downloadable mobile application. In some embodiments, the predetermined fillable templates may be customizable and may be created using the mobile application. The report fields may be arranged as a predetermined report.

After providing the fillable template to a first user at step 220, the method may further include receiving from the mobile device over a mobile network a plurality of SMS messages sent over SMS at step 230. The SMS messages may be received by the server either directly or through one or more intermediate devices such as a short message service centers or a mobile switching center. The mobile device may not have an active Internet connection, thus limiting the first user's ability to transmit bulk data over the Internet and forcing the first user to rely on an available mobile network. Each SMS message may represent data entered by the first user into one of the plurality of input fields of the predetermined fillable template provided to the first user through the graphical user interface displayed on the mobile device associated with the first user. The SMS messages may be automatically encrypted and decrypted as appropriate to ensure that the bulk data is transferred in a secure manner.

After associating each received SMS message with the correct corresponding report field of the predetermined report at step 240, the method may include sending the plurality of SMS messages from the server to the computing device associated the second user. At step 250, the SMS messages may subsequently be populated into the report fields. At step 260, the SMS messages may be displayed as the predetermined report to the second user through the graphical user interface displayed on the computing device associated with the second user. The computing device associated with the second user may be a mobile device connected to a mobile network. In such cases, the mobile device associated with the second user may, like the mobile device associated with the first user, not have an active Internet connection, thus forcing the second user to rely on the available mobile network for transmitting information to the first user. Alternatively, the computing device associated with the second user may be a desktop computer running a web-based application with access to a non-mobile communications network. At step 270, the method may further include sending to the computing device associated with the second user an alert notifying the second user that the first user has transmitted bulk data over the mobile network by way of the predetermined report.

Figure 3:
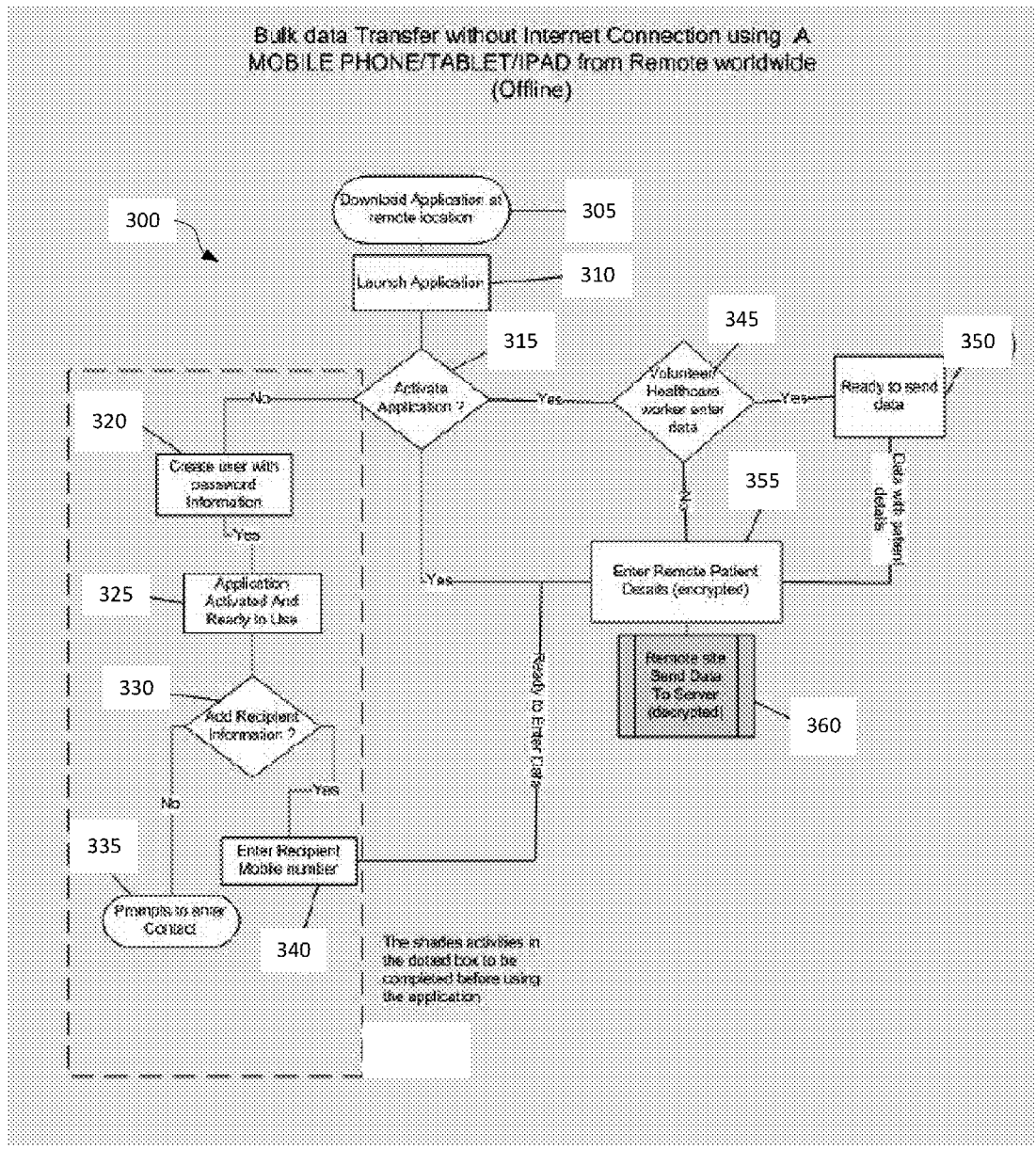
FIG. 3 illustrates the operation of one exemplary system for efficiently transmitting bulk data over a mobile network.

FIG. 3 illustrates the operation of one exemplary system 300 for efficiently transmitting bulk data over a mobile network. At block 305, a user may use an available mobile network to download a mobile application onto a mobile device. One example of a mobile device is the iPhone® sold by Apple Inc. of Cupertino, Calif. The mobile application may be available for download in a virtual marketplace for mobile applications, such as the App Store maintained by Apple Inc. At block 310, the user may launch the application. The mobile application may include executable instructions that, when executed by a processor of the mobile device, cause the mobile device to render a series of graphical user interfaces (like those shown in FIGS. 4-7 and 9) and display the interfaces to the user through a display panel of the mobile device.

At block 315, the user may attempt to activate the application, at which point the application determines whether the user is logged in under previously registered login credentials. At block 320, if the user is a first time user, the application may request that the user register new login credentials, such as a registered user name and password.

Figure 4:
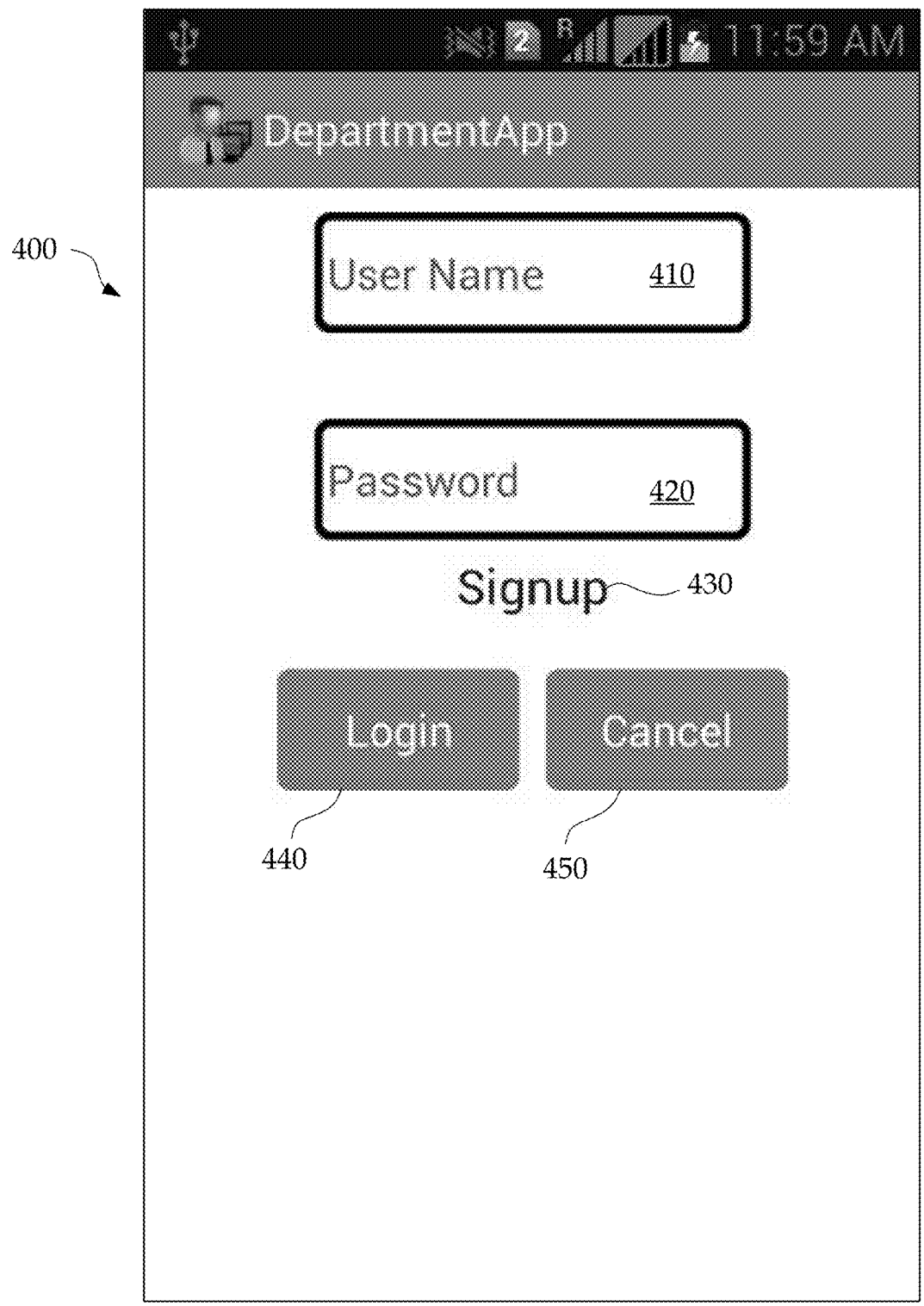
FIG. 4 illustrates an exemplary user interface through which a user may register new login credentials using the mobile device.

FIG. 4 illustrates an exemplary user interface 400 through which a user may register new login credentials using the mobile device. User interface 400 may include a plurality of fillable fields, such as a "user name" field 410 and a "password" field 420. User interface 400 may further contain a "signup" link or button 430 that, when selected by the user, transmits the new login credentials to be stored in memory by a registration server or other computing device. User interface 400 may also contain a "login" button 440, which a return user may select to submit pre-existing login credentials. If the user is a return user, the application may forward the submitted login credentials to the registration server or other computing device to be compared against a stored list of registered credentials. User interface 400 may further include a "cancel" button 450 that, when selected by a user, may cause the application to return the user to a default startup or home page. Further details concerning the login process are widely known and will be readily recognized by persons of ordinary skill in the art.

Referring back to FIG. 3, at block 325, once the registration server or other computing device has verified the user's login credentials, the application may become activated and ready for use. As illustrated at blocks 330 through 340, the application may request that the user use the graphical user interface to submit information about the recipients to which the bulk data will be transmitted. At block 340, for example, the application may prompt the user to enter a recipient mobile number.

Figure 5:
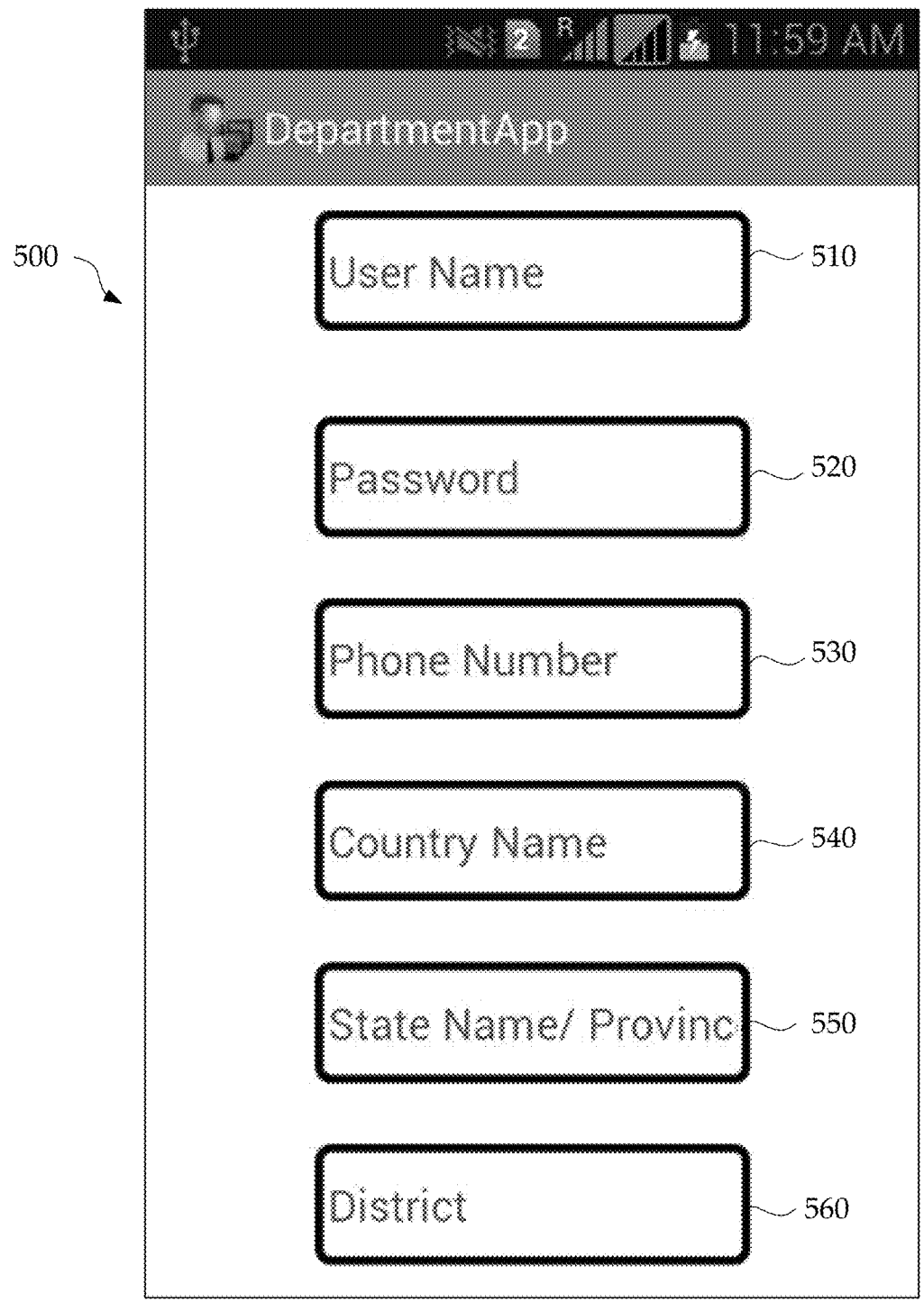
FIG. 5 illustrates an exemplary user interface through which a user may submit recipient information or additional information associated with the user.

FIG. 5 illustrates an exemplary user interface 500 through which a user may submit recipient information or additional information associated with the user. User interface 500 may contain fillable fields 510 through 560 that allow the user to transmit user name, password, phone number, and geographic information (e.g., country name, state name, and district). User interface 500 may further contain a "submit" link or button (not shown) that, when selected by the user, transmits the information to be stored in memory by a registration server or other computing device.

The application may include executable instructions that, when executed by the processor of the mobile device, render and display one or more preformatted, fillable forms or templates as a graphical user interface. FIGS. 6A through 6C illustrate exemplary templates 600, 605, and 610 within the context of the healthcare field. When the application is activated, it may render and display a list, index, chart, or other visual depiction of available templates for the user to consider. Exemplary template 600 may, for instance, be a template designed to assist a remote clinic volunteer in collecting patient data concerning a chronic cough. To that end, exemplary template 600 may include a plurality of fillable fields 615 through 640 that each operate as a mechanism by which to collect a discrete SMS message that correlates to a particular field of a predetermined report generated and maintained by the present technology. Exemplary template 605 may likewise include fillable fields 615 through 640 and may concern the construction of a predetermined report designed to assist a physician in diagnosing a pregnancy-related health issue. Exemplary template 610 may include a plurality of additional fillable or selectable elements (e.g., fillable fields 645, 650, 655, and 660, radio buttons 665, and the like) designed to assist a physician in diagnosing a health issue related to deep vein thrombosis (DVT) in pregnancy.

Figure 7:
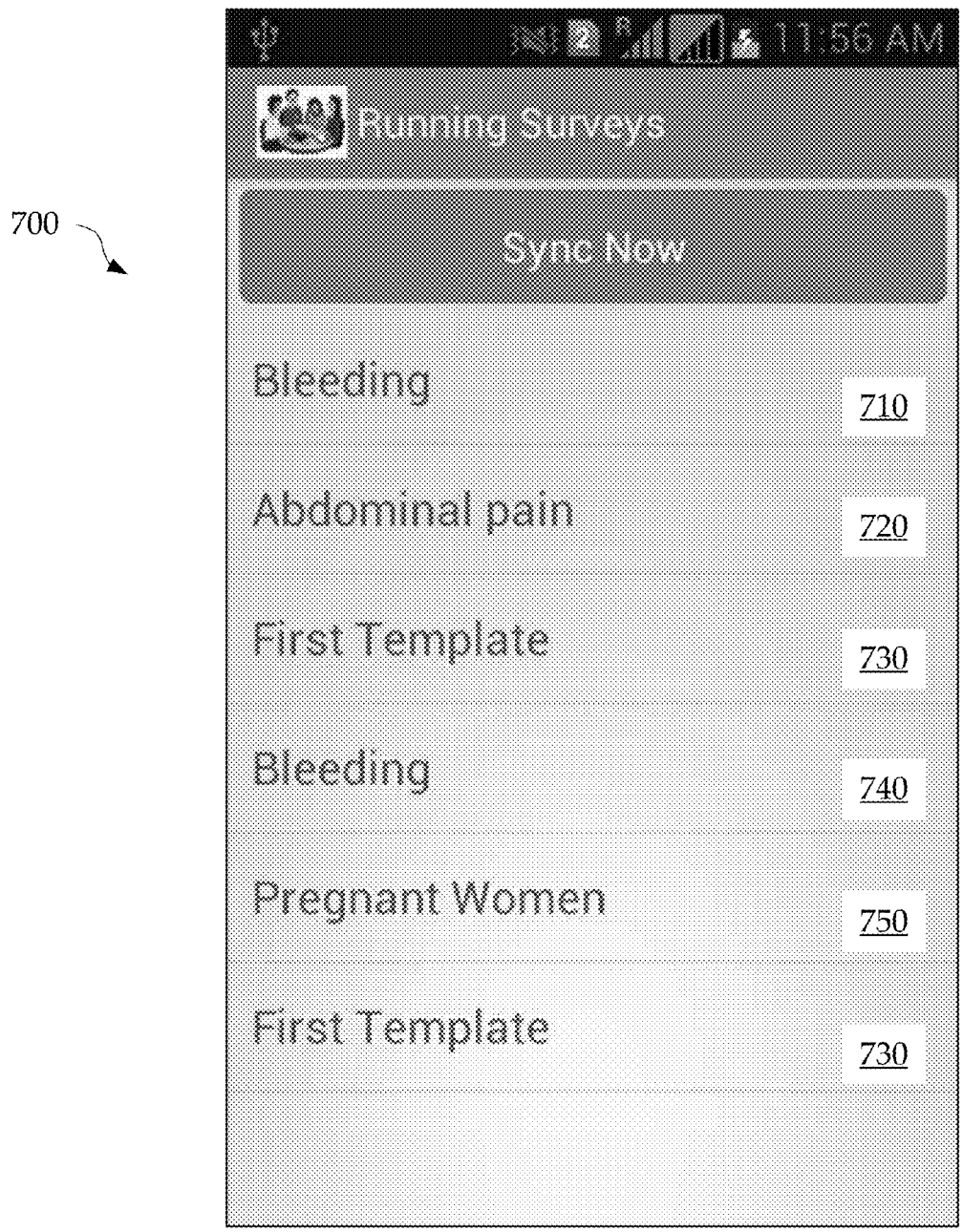
FIG. 7 illustrates an exemplary list of available templates as may be used by a healthcare clinic volunteer working in a remote region.

FIG. 7 illustrates an exemplary user interface 700 presenting a list of available templates as may be used by a healthcare clinic volunteer working in a remote region. In the example shown in FIG. 7, the list of available templates includes templates entitled "Bleeding" 710 and "Abdominal pain," 720 as might be used to fill out information intended to help a recipient physician diagnose a clinic patient. The interface displays "First template" as a default placeholder label 730 for illustrative purposes. Any number of additional predetermine templates for the collection of data through discrete SMS messages may be available, such as a different template concerning "Bleeding" 740, or a template concerning "Pregnant women" 750. Upon obtaining an additional template, the "First template" label 730 would be replaced with an appropriate name for the new template, such as "Fainting."

The application may receive a user selection of one of the available templates. The application may then render and display a template as a graphical user interface. Each template may contain information and instructions for the user. Each template may also contain any number of data entry tools, including fillable fields, selectable checkboxes or buttons, pull-down menu selections, and other such data entry options. As shown in FIGS. 6A and 6B, for example, an exemplary template used within the healthcare context may include fillable fields such as those labeled "name," "age," weight," "height," "community" and "village." As shown in FIG. 6C, an exemplary template may further include selectable buttons.

Referring back to FIG. 3, at block 345, the user may populate the template with bulk data by using the data entry tools. The user may control the data entry tools by using a virtual keyboard displayed as a graphical user interface on a display panel of the mobile device (e.g., a touch keypad), a conventional button-style keyboard, a separate keyboard with wireless or Bluetooth® connectivity, or any number of other well-known mechanisms for communicating characters. In the examples shown in FIGS. 6A and 6B, the user has populated the "community" and "village" fields.

At block 350, the user may indicate that he or she has finished populating the template by pressing a button on the graphical user interface (e.g., a "finish" or "submit" button).

At block 355, the application transmit the bulk data entered into the template using processing logic that interfaces with existing SMS functionality available on the mobile device. Each data field in the template may be processed and transmitted as a discrete SMS message. For instance, where a "Town" data field is populated with the response "Town 1" as shown in FIG. 6C, the application transmits to a server or other computing device a discrete SMS message consisting of the characters "Town 1" to be stored in a table record. Prior to being transmitted, the application may encrypt the data with any number of well-known encryption methods to ensure that the bulk data is transferred securely. Protecting the privacy of the bulk data may be particularly important in certain circumstances. When transmitting healthcare-related data, for instance, the user may be subject to the Health Insurance Portability and Accountability Act (HIPAA).

At block 360, the messages may be received by a message server or other computing device. As described above, the message server or other computing device may maintain a relational database stored in memory. As described above, the discrete SMS messages comprising the bulk data may be stored in memory in a table or through another suitably an organized fashion that permits the server or other computing device to maintain a link between the data fields displayed to the user and the report fields that the application needs to populate accurately to render and display the report template.

Figure 8:
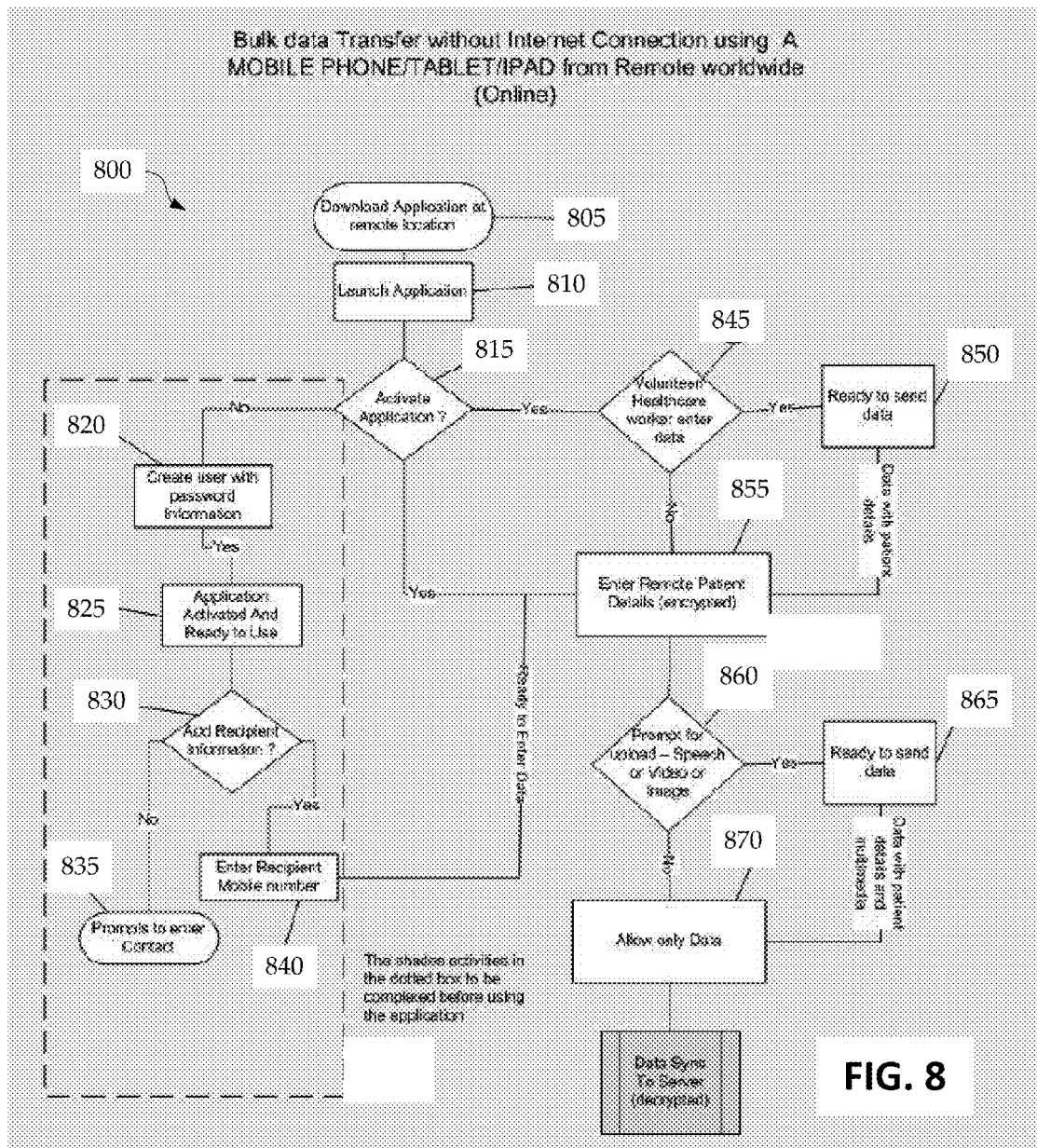
FIG. 8 illustrates the operation of another exemplary system for efficiently transmitting bulk data over a mobile network.

FIG. 8 illustrates the operation of another exemplary system 800 for efficiently transmitting bulk data over a mobile network. Although embodiments of the present invention are extremely advantageous when used in remote geographies in which a reliable Internet connection may not be established, they can also be used effectively when an Internet connection is available. Thus, as shown in the exemplary graphically user interfaces of FIGS. 9, 10A, and 10B, the application may provide a user with the option of using either "online" mode or "offline" mode.

In the embodiment depicted in FIG. 8, the mobile device associated with the user may be able to establish a reliable Internet connection in addition to the mobile network. The operation shown in FIG. 8 represented by blocks 805 through 855 is the same as described above with respect to blocks 305 through 355 of FIG. 3, except that the system's Internet connection permits enhanced data transfer functionalities.

As shown beginning at block 860, when the application detects that the mobile device has established an Internet connection in addition to the existing mobile connection (i.e. is operating in online mode), the application may automatically inform the user that the user can populate the template with data having formats other than SMS messages, including multimedia files (e.g., audio, image, or video files). For example, as shown in the exemplary graphical user interface of FIG. 9, the system may notify the user with an indicator light, pop-up message, push notification, or any other suitable form of notification, that media messages—in addition to SMS messages—may be transmitted. At block 865, when the user selects to send data having formats other than SMS messages, including multimedia files, the application receives an indication of such data and the computing device of the remote user transmits the data to the server (where it may then be decrypted). At block 870, when the user elects to send only standard data via SMS messages, no multimedia data is transmitted to the server (where it may then be decrypted).

Figure 9:
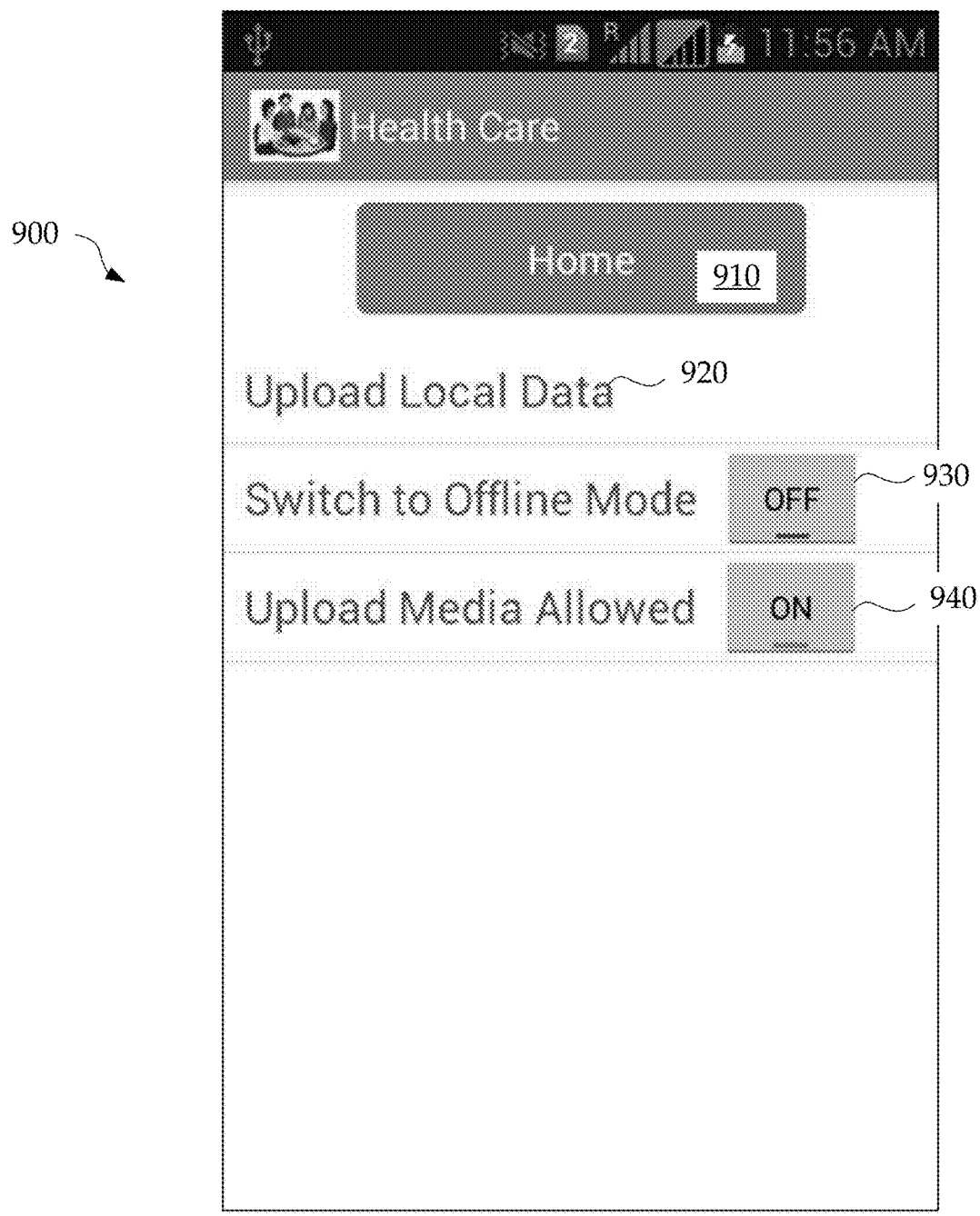
FIG. 9 illustrates an exemplary user interface through which a user may switch between offline mode and online mode.

FIG. 9 illustrates an exemplary user interface 900 through which a user may switch between offline mode and online mode. User interface 900 may include a "home" button 910 that, when selected by the user, may cause the application to render and display a different user interface (e.g., a default home screen). User interface 900 may also include a selectable element 920 that, when selected by the user, provides the user with options for uploading data locally stored on the mobile device of the user. User interface 900 may further include selectable elements 930 and 940 that, when selected by the user, may permit the user to switch between online/offline mode and upload media, respectively.

Figure 10B:
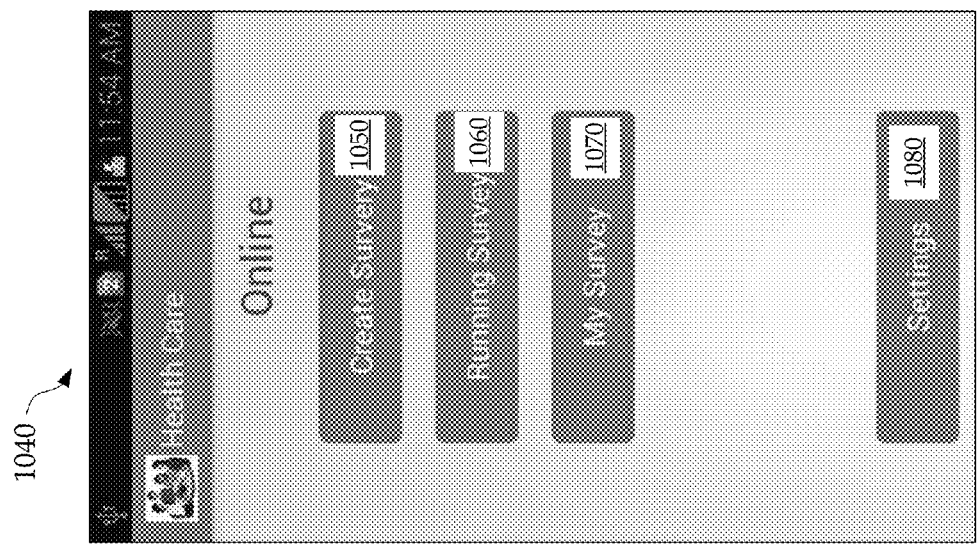
FIG. 10B illustrates an exemplary graphic user interface that the application may display when running in online mode.
Figure 10A:
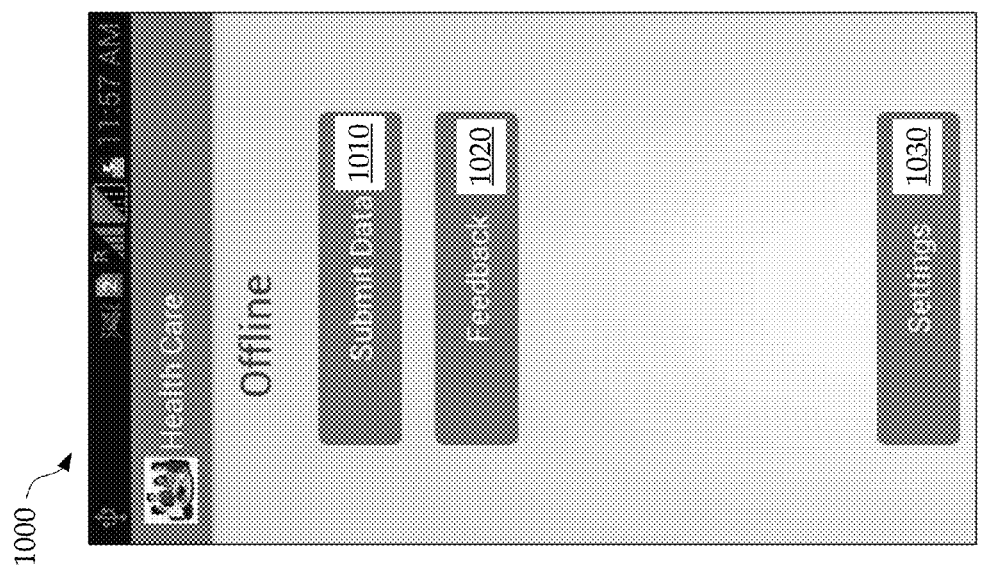
FIG. 10A illustrates an exemplary graphic user interface that the application may display when running in offline mode.

FIG. 10A illustrates an exemplary graphic user interface 1000 that the application may display when running in offline mode. In offline mode, the user may be limited to either submitting any data that has been entered into one or more of the templates (e.g., by selecting "submit data" button 1010) or viewing feedback received from a second user (e.g., by selecting "feedback" button 1020) as discussed further below. User interface 1000 may further a "settings" button 1030 that, when clicked, permits a user to configure one or more settings associated with the application. For instance, the user may configure the application and the system between online and offline modes.

FIG. 10B illustrates an exemplary graphic user interface 1040 that the application may display when running in online mode. In addition to being able to transmit data formats other than SMS messages when in online mode, including multimedia files (e.g., audio, image, or video files), the application may further receive survey data from the user when in online mode. For instance, as shown in the exemplary interface of FIG. 10B, the application may receive survey data from the user that allows the user to create a custom survey (which the user may initiate by clicking a "create survey" button 1050), participate in a survey created by another user (which the user may initiate by clicking a "running survey" button 1060), or view the results of a previously created survey (which the user may initiate by clicking a "my survey" button 1070). In some embodiments, a survey may be a populated template as described above. For instance, "create survey" functionality 1050 may be used to select which template the user wishes to populate with data. The template may be populated at the server level in real time when in online mode. "Running survey" functionality 1060 may be used to check the status of the currently selected template. For instance, the user may wish to select "running survey" button 1060 to return to a previously saved template that was partially populated but not submitted. "My survey" functionality 1070 may be used to review a populated template or "survey" that was previously submitted to the server. User interface 1040 may further a "settings" button 1080 that, when clicked, permits a user to configure one or more settings associated with the application. For instance, the user may configure the application and the system between online and offline modes.

Figure 11:
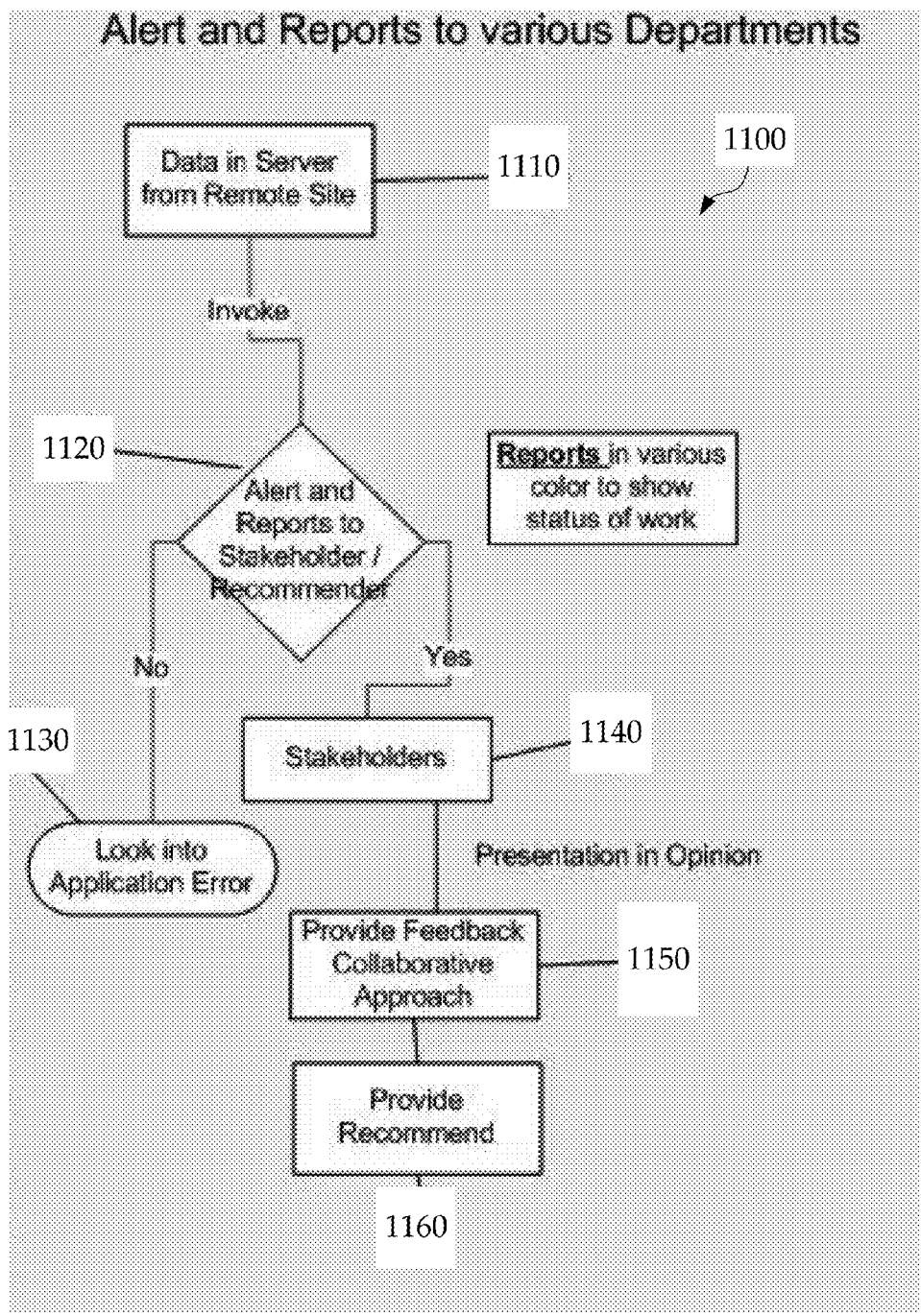
FIG. 11 illustrates the operation of another exemplary system for efficiently transmitting bulk data over a mobile network.

In one embodiment, the system may include alerting and reporting functionalities. FIG. 11 illustrates an exemplary process 1100 through which the system may be used. As shown in FIG. 11, block 1110 begins assuming that the server or other computing device has received a bulk data transfer from the user, who cannot establish an Internet connection due to his or her remote geography or some other limitation. At block 1110, the server or other computing device receives and stores the bulk data in memory as described above (e.g., in a relational database with a table that maintains the correlations between the input fields on the predetermined fillable template displayed to the user in the remote geography and the report fields displayed to a second user via the predetermined report template. At block 1120, in addition to transmitting the bulk data to the second user by way of the report template, the system sends the computing device associated with the second user an alert indicating that the user has received a report. At block 1130, if the report is not transmitted successfully, the system transmits an application error to the mobile device associated with the second user. At block 1140, if the report is transmitted successfully, the second user may review the report. At block 1150, the second user provides responsive feedback, which the first user receives through at his or her mobile device. At block 1160, the first user provides a recommendation to a patient.

In some embodiments, the reports may include various visual indicators to convey the status of certain action items or flags associated with certain information. In one embodiment, for example, the visual indicators may be colored or highlighted portions of texts, colored or moving (e.g., flashing) icons, bolded or underlined text, or any number of other common visual indicators. In another embodiment, the visual indicator may be a pop-up notification that the second user must click to close. The visual indicators are useful for communicating the urgency of certain information or the general progress of a project. For instance, in an embodiment in which the selected templates apply to the construction industry, the report template may display an overall project completion bar in which a project completion percentage under 25% is displayed in red, a project completion percentage between 25% and 75% is displayed as yellow, and a project completion percentage above 75% is displayed as green. In another embodiment in which the selected templates apply to the healthcare field, the system may automatically detect certain diagnostic information as needing to be urgently conveyed to the second user. For instance, where the system receives an SMS text containing the term "pregnant" or a phonetic equivalent of the same, the report template may include a visual indicator designed to quickly alert a healthcare provider viewing the report (e.g., a flashing red indicator icon or a pop-up notification window).

In some embodiments, the alerts and visual indicators may always be included within report templates as a default (e.g., in the case of displaying the project completion percentage). In other embodiments, the alerts and visual indicators may be trigged by a predetermined condition. As noted above, one such condition may be the system's recognition of the term "pregnant" within one of the many SMS message comprising a submitted bulk data template. The server or other computing device maintaining the relational database may likewise include executable instructions that, when executed by a processor of the server or other computing device, examine the incoming SMS messages (which may be maintained as records in a table) for strings that satisfy a predetermined condition and thus cause the report to include an alert. The examination process may include comparing the strings of an SMS message to one or more strings stored in a table of predetermined trigger strings to determine whether a match is present.

Much like the executable application downloaded, installed, and activated on the mobile device of the first user (i.e., the user located in a remote region or otherwise unable to establish Internet connectivity), the second user may download, install, and activate a copy of the application to his or her computing device. In some instances, the computing device associated with the second user may be a smartphone or tablet, in which case the mobile application may be the same mobile application downloaded by the first user. In other cases, the computing device may be a laptop, desktop, or other computing device for which the use of a web-based application is more suitable. In either case, application may include executable instructions that, when executed by a processor of the mobile device, cause the computing device to render a series of graphical user interfaces and display them to the user through a display panel of the computing device. Using the application in a manner similar to that described above with respect to the application available to the first user, the second user may reply to the first user's bulk data transmission with a bulk data transmission of his or her own. The reply transmission may contain feedback, instructions, or other follow-up information for the first user to access via the application on his or her mobile device. When the first user receives the follow-up information, it may appear as a report template similar to those described above. Once the first (i.e., remote) user receives the report, the first user may proceed to use the information to complete a task (e.g, rendering healthcare guidance to a family in a remote village based on the information in the report where the second non-remote user was a physician recommending treatment protocols).

In some instances, the system may transmit the data received from the first user (i.e., the user located in a remote region or otherwise unable to establish Internet connectivity) to multiple non-remote users (e.g., a third user, a fourth user, and a fifth user, in addition to the second user). In such cases, the non-remote users may each receive the data transmitted by the first user after the first user has submitted the data to the server by way of discrete SMS messages (which, as discussed above, may correspond to the data fields in the populated template displayed on the graphical interface rendered by the application running on the first user's mobile device). The multiple non-users may all review the data and submit comments by populating the report template displayed by the application. The population of data may be dynamic, such that comments may be added or removed by different commenters at the same time and displayed in real time. The multiple non-remote users may designate a moderator with the authority to make the final decision on what data will be transmitted back to the first user in the form of the report (which may be encrypted for data security purposes). The first user may then view the preformatted report from the moderator and the other non-remote users on the graphical interface of the first user's mobile device. In some embodiments, as discussed above, the first user may receive an alert prior to receiving the report from the moderator and the other non-remote users.

One example of the above functionality may occur in a healthcare setting (although the functionality may be used with equally efficacy in any number of other industries). A remote clinic worker may use the presently disclosed technology to transmit diagnostically valuable information to the server. The data may be transmitted in the form of multiple discrete (and encrypted) SMS messages sent over a mobile network when no Internet connection is available (although the foregoing process may also occur when in online mode). The server may then decrypt the messages and store them as data in the appropriate table. The server may access the relationship rules or links between the data fields in the preformatted template and the data fields in the preformatted report for that particular template. The server may then transmit the data from the clinic worker to multiple healthcare workers on a medical team (again as discrete SMS messages where only a mobile network is available, or directly as bulk data where a fixed connection is available on the non-remote user's side). The multiple healthcare workers—for instance, physicians in different departments—may utilize the data to perform different diagnoses relevant to their respective medical field (or they may comment on the same field) and then may submit their comments into the report fields displayed in the preformatted report template on their respective computing devices (e.g., a smartphone or a desktop computer displaying a web application). The multiple physicians may have elected one particular physician to serve as the moderator and to make the final call on which medical advice is rendered. The moderator may use the application to select which data is ultimately transmitted back to the clinic worker and the server may transmit to the clinic worker only that report data (e.g. the medical advice) finally designated by the moderator. The responsive data supplied by the one or more physicians may be received as discrete SMS messages or, where the computing device of the physicians or other second users is connected to a non-mobile communications network, the responsive data may be received over the non-mobile network and then translated into SMS messages. As noted above, the process may be executed in either offline or online mode.

Figure 12:
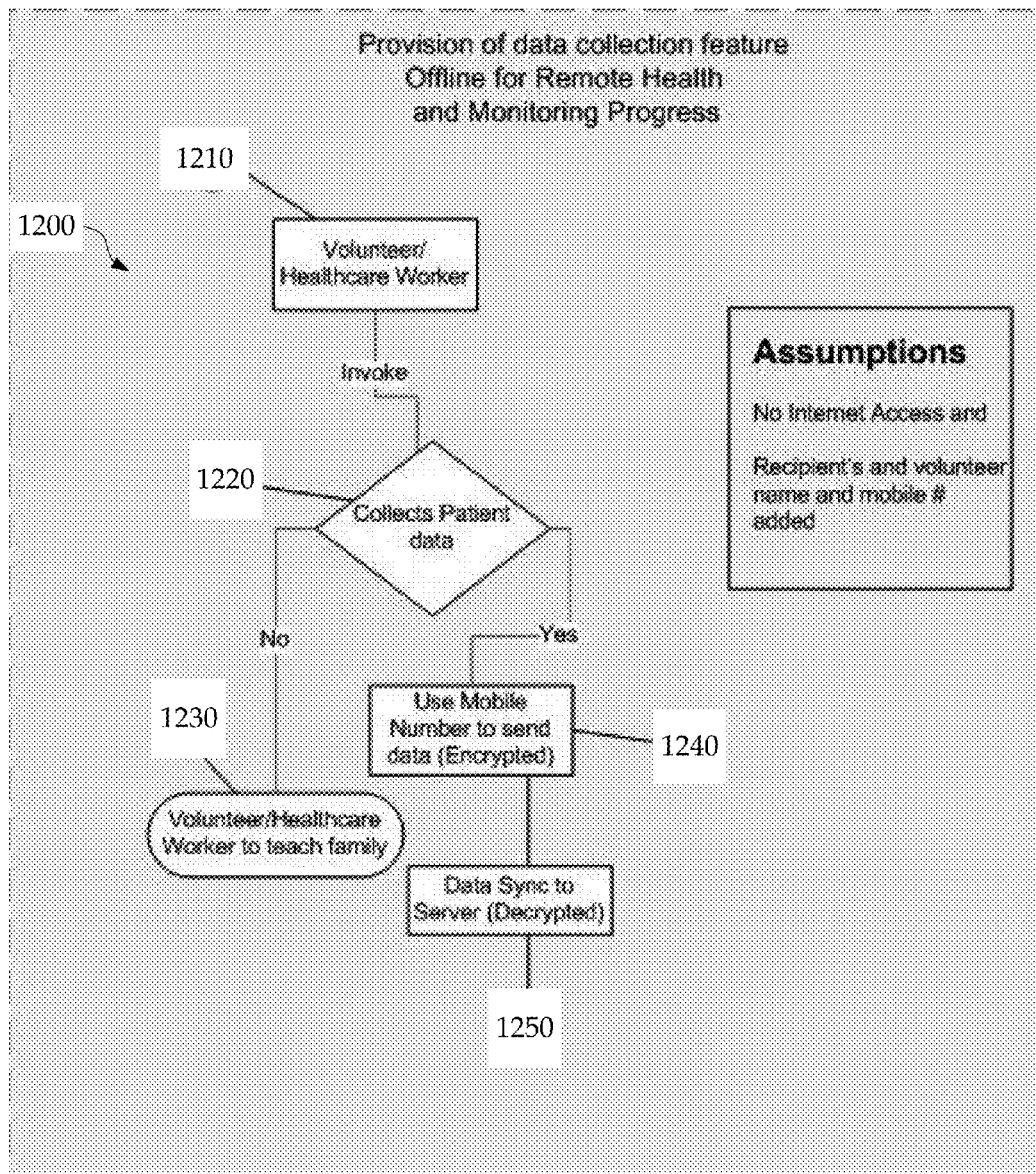
FIG. 12 illustrates an exemplary method for efficiently transmitting bulk data over a mobile network in the context of the healthcare field.

FIG. 12 illustrates an exemplary method for efficiently transmitting bulk data over a mobile network in the context of the healthcare field. Beginning at block 1210, FIG. 12 assumes that no Internet connection is available and that a healthcare worker (e.g., a volunteer nurse working at a clinic in a remote region of Africa) has downloaded and installed the application described above in his or her mobile number. FIG. 12 further assumes that the healthcare worker has submitted a recipient's name and phone number. At block 1220, the healthcare worker collects patient data from a patient. At block 1230, if the healthcare worker was unable to collect patient data, for instance because the patient was uncomfortable providing the data or did not understand why providing the data is important, the healthcare worker may teach the patient and the patient's family about why collecting the data is important. At block 1240, the healthcare worker enters the patient data into the application by way populating a predetermined data template. The health worker does so by using a variety of data entry tools displayed in the template. The template is displayed as a graphical user interface on a display panel of the healthcare worker's mobile device. At step 5, the healthcare worker submits the populated template. When the healthcare worker submits the template, the application executes instructions that cause the mobile device to transmit multiple SMS messages to be stored by a server or other computing device communicatively connected to the mobile device. The mobile device may transmit the SMS messages in succession, simultaneously, or in groups of messages depending on the status of the mobile connection (e.g., available mobile bandwidth). As illustrated at block 1250, transmitting the data may include decrypting any encrypted SMS message data.

Figure 13:
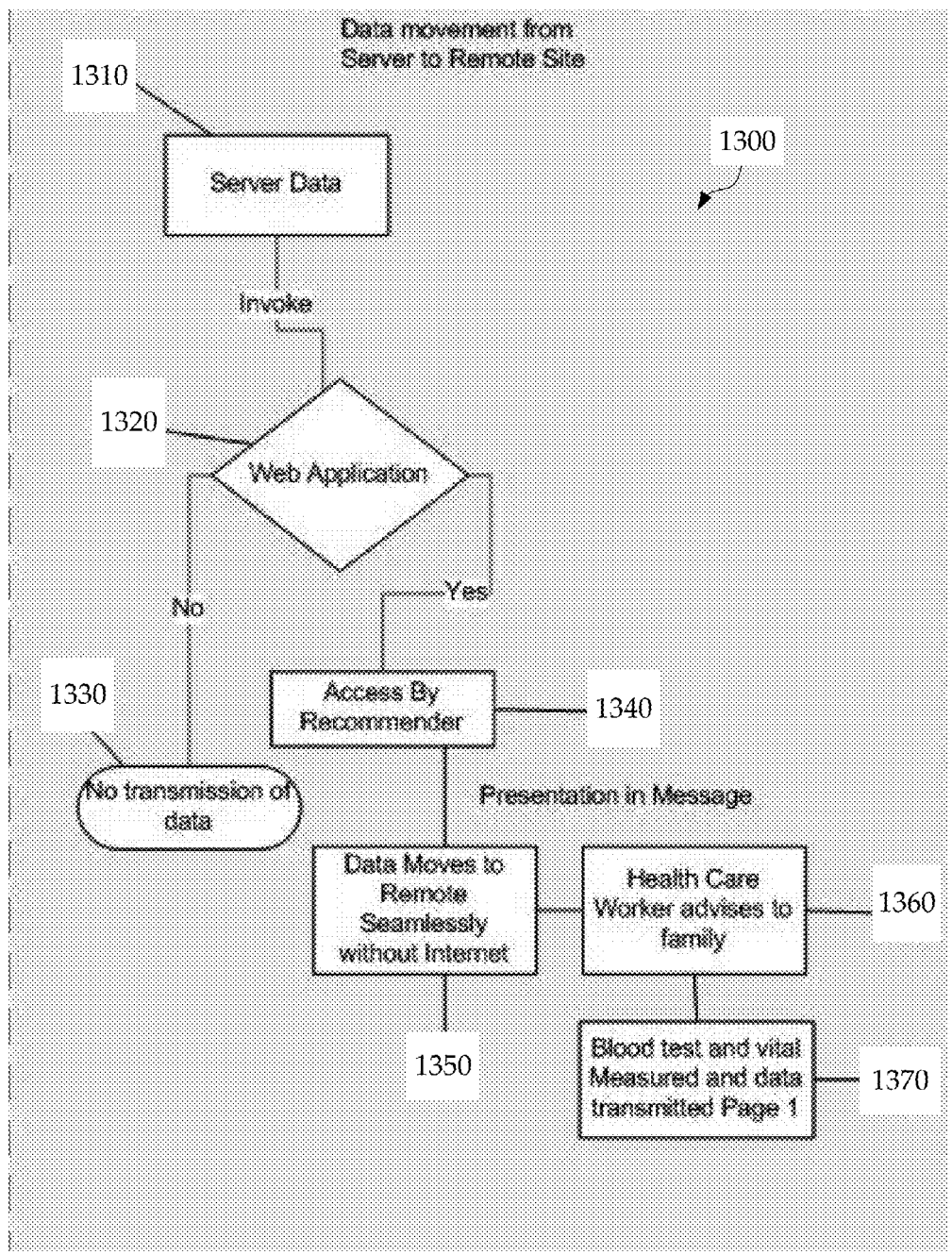
FIG. 13 illustrates an exemplary flow in which data moves from a server or other computing device to the mobile device of a user who cannot establish a reliable Internet connection.

FIG. 13 illustrates how, in one embodiment, data moves from a server or other computing device to the mobile device of a user who cannot establish a reliable Internet connection. Beginning at block 1310, a server or other computing device maintains a table of records in a database stored in memory. Each record is an SMS message that the server or other computing device received from a mobile device associated with a first user. The first user may not be able to establish an Internet connection (e.g., a clinic worker in a remote hospital setting). In the context of the healthcare field, the first user may be a clinic worker in a remote hospital setting, while a second user to whom the first user is attempting to transmit bulk data by way of the aforementioned templates may be a physician or other party capable of providing recommendations to the clinic worker. Unlike the first user, the second user may have access to an Internet connection. In such cases, the server or other computing device may connect to a computing device associated with the second user over the Internet or over another fixed communications network. As a result, at block 1320, the second user may utilize a web-based application to view the report template produced by the system in response to a template submission by the first user. If the second user does not or cannot access the web-based application, then in some instances no data may be transmitted as illustrated at block 1330. If the second user can access the web-based application as illustrated at block 1340, the second user may provide feedback to the first user by populating the report template provided by the system. At block 1350, the data may be transmitted as discrete SMS messages populated into the report template over a mobile network. As illustrated at blocks 1360 and 1370, the first user may receive and review the report data (e.g., diagnosis and recommended health-related tasks) at the mobile device of the first user, convey any recommendations of the second user to a patient, and conduct any health-related tasks as instructed by the second user and authorized by the patient.

Figure 14:
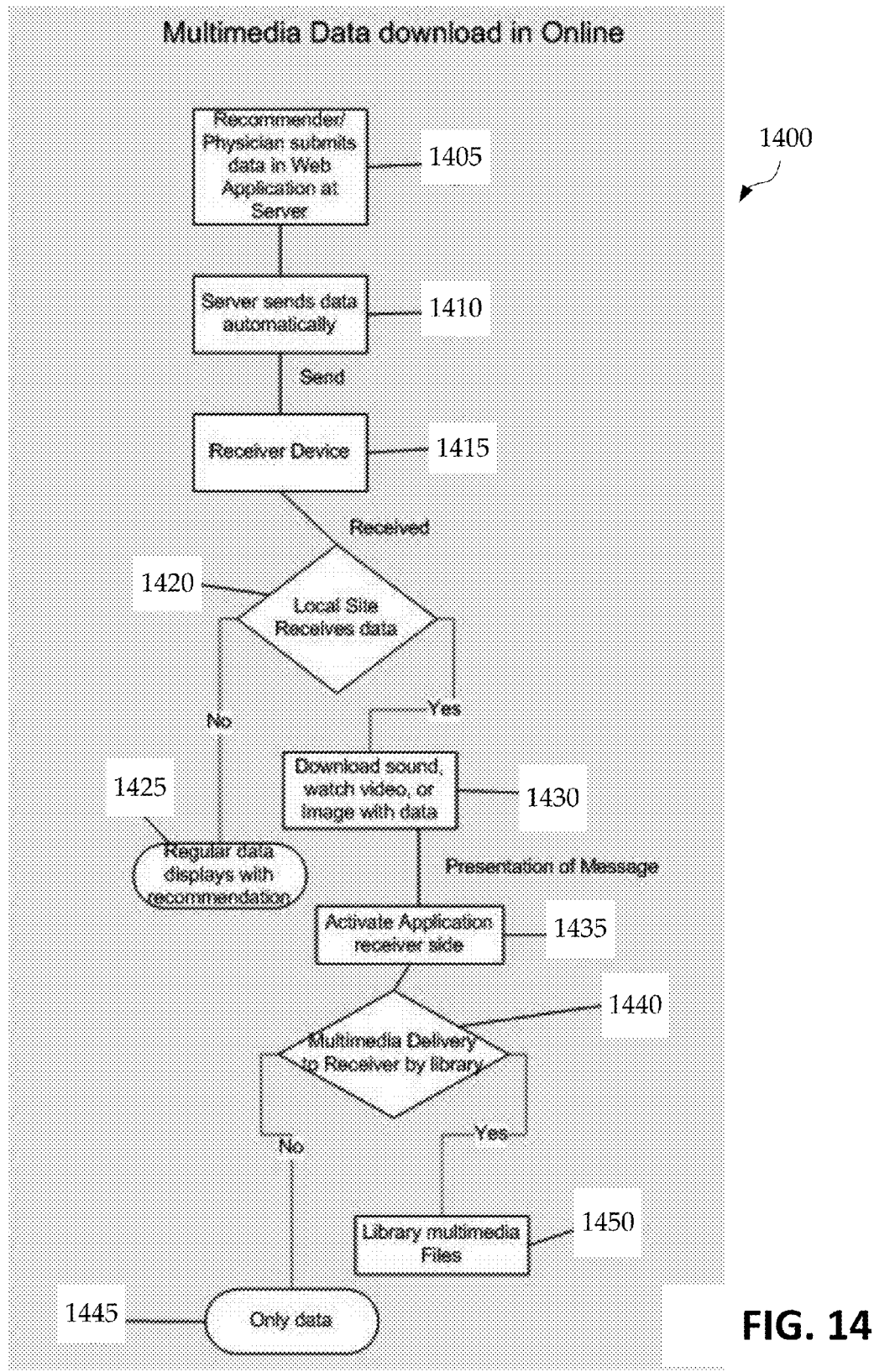
FIG. 14 illustrates an exemplary process of a multimedia data download in online mode.

FIG. 14 illustrates an exemplary process 1400 of a multimedia data download in online mode. At block 1405, a recommender (e.g., a physician) who may be the second "non-remote" user referenced above, submits data through a web application hosted by a server. The recommender may submit the data through a predetermined fillable template as discussed above. The recommender may do so in response to having previously received a predetermined report from a different user, such as a user located in a remote region. At block 1410, the server automatically forwards the received data. At block 1415, a receiver device receives the forwarded data. The receiver device may be, for example, a mobile device associated with the user located in a remote region. The mobile device may have access to a reliable Internet connection, thus enabling it to utilize online mode.

At block 1420, the receiver device receives data submitted by the recommender back at block 1405. As demonstrated by blocks 1425 and 1430, respectively, the receiver device automatically receives as much data as its connectivity permits. For instance, as shown at step 1430, if the data submitted by the recommender included a multimedia data (e.g., a video or audio clip) and the receiver device is operating in online mode, then the receiver device automatically receives the multimedia data. As shown at step 1425, however, if the receiver device is operating in offline mode or is otherwise unable to receive multimedia data, then the receiver device automatically receives regular non-multimedia data in the form of discrete SMS messages submitted to the predetermined fillable template by the recommender. As a result, the recommender may still provide recommendations even when multimedia data may not be transmitted due to connectivity issues.

At block 1435, the user located in the remote region activates an executable mobile application (like that discussed previously) on his or her mobile device (i.e., the receiver device). At blocks 1440 through 1450, if connectivity permits and online mode is available, the user in the remote region may transmit multimedia data to the recommender in the non-remote location. For instance, the user in the remote region may be a construction worker who recorded a video of the last stages of a project being completed. The worker may transmit the video, along with standard data transmitted by way of SMS messages (as described above), to his boss in a non-remote location such as Cincinnati, Ohio. As noted above, the user in the remote region may likewise receive such multimedia files.

Figure 15:
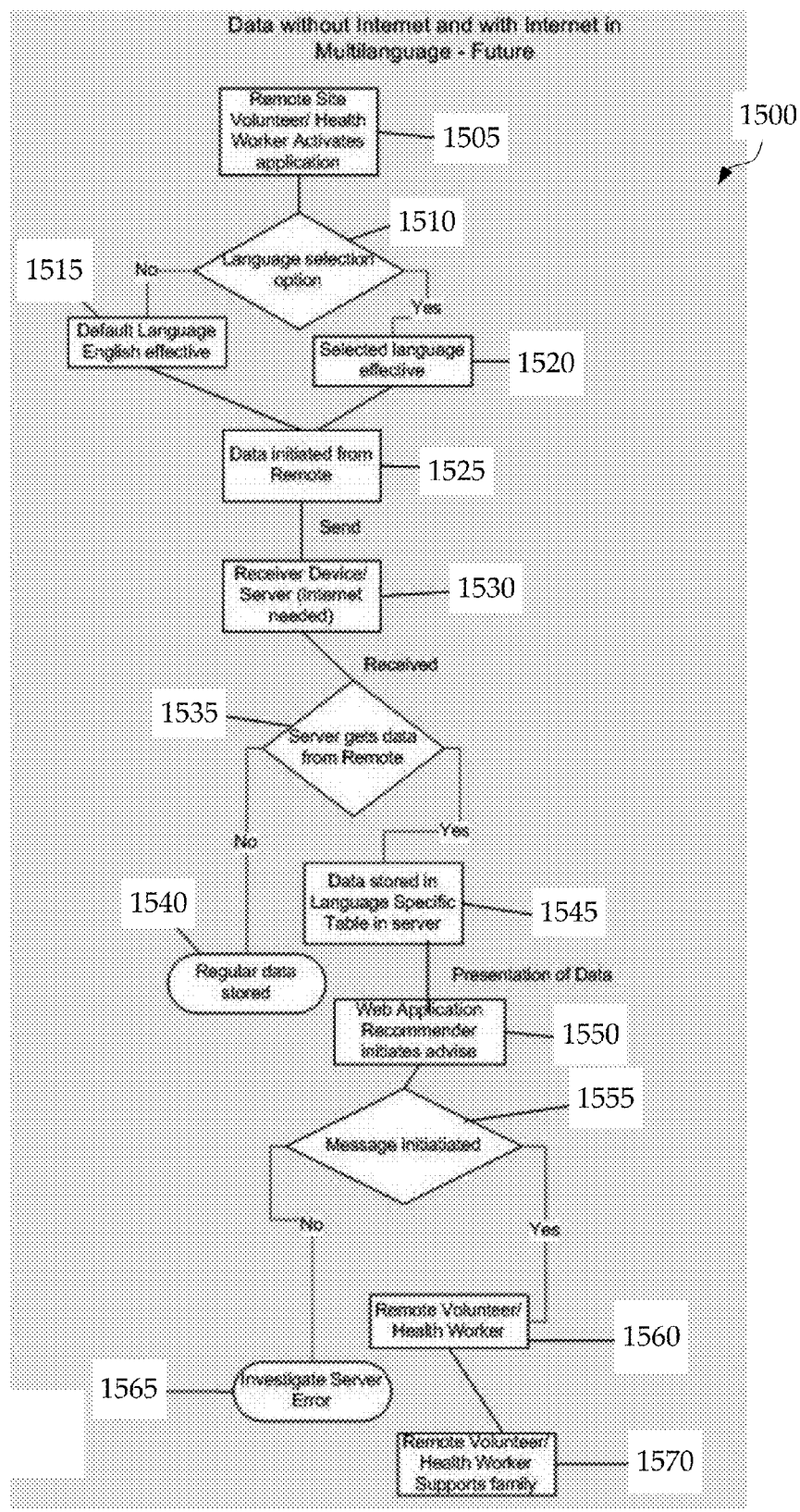
FIG. 15 illustrates a multilanguage feature of an exemplary system for transmitting bulk data.

FIG. 15 illustrates an exemplary process 1500 of a multilanguage feature of an exemplary system for transmitting bulk data. At block 1505, a user at a remote site without a reliable Internet connection activates the executable mobile application previously downloaded to his or her mobile device. At block 1510, the application presents the user with a language selection option. As shown at block 1515, the user may proceed using English as the default language. As shown at block 1520, the user may also select a non-English language such as Spanish or German. At blocks 1525 and 1530, data is transmitted from the mobile device of the remote user to a server by sending discrete SMS messages populated into a predetermined fillable template (as discussed above). Notably, a reliable connection to the Internet may be necessary to access online mode. At block 1535, the server may receive data from the remote user. At block 1540, the data may be stored in memory of the server in a default table that is not specific to any particular language. Alternatively, at block 1545, the data may be stored in the server in a language-specific table At blocks 1550 through 1570, the process may proceed as previously described above with the user in the non-remote region receiving the data transmitted by the user in the remote region using by way of discrete SMS messages populated into a preformatted form or template. The provision of the multilanguage functionality allows the user in the remote region to select a particular language and transmit messages in that particular language. In doing so, it facilitates communications with different communities that may speaks languages other than English.

Figure 16:
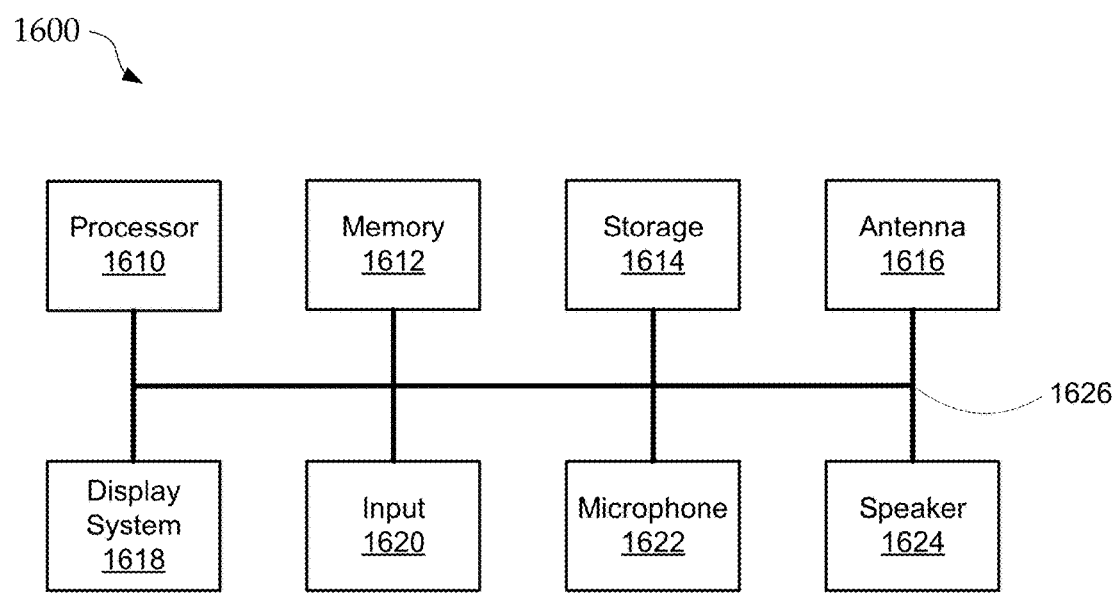
FIG. 16 illustrates an exemplary computing device.

FIG. 16 illustrates exemplary computing device. The computing device 1600 of FIG. 16 (e.g., a mobile device, a server, a desktop computer, or the like) may include one or more processors 1610 and memory 1612. Memory 1612 stores, in part, programs, applications, instructions, and/or data for execution and processing by processor 1610. The system 1600 of FIG. 16 may further include storage 1614, one or more antennas 1616, a display system 1618, inputs 1620, one or more microphones 1622, and one or more speakers 1624.

The components shown in FIG. 16 are depicted as being connected via a single bus 1626. However, components 1610 through 1624 may be communicatively coupled through one or more data transport means. For example, processor unit 1610 and main memory 1612 may be communicatively coupled via a local microprocessor bus, while storage 1614, display system 1618, input 1620, and microphone 1622 and speaker 1624 may be connected via one or more input/output (I/O) buses.

Memory 1612 may include local memory such as random access memory (RAM) and read-only memory (ROM), portable memory in the form of an insertable memory card or other attachment (e.g., via universal serial bus), a magnetic disk drive or an optical disk drive, a form of Flash or programmable read-only memory (PROM), or other electronic storage medium. Memory 1612 can store the system software for implementing some embodiments for purposes of loading that software into main memory 1610.

Antenna 1616 may include one or more antennas for communicating wirelessly with another device. Antenna 1616 may be used, for example, to communicate wirelessly via "Wi-Fi," "Bluetooth," with a cellular network, or with other wireless protocols and systems. The one or more antennas may be controlled by a processor 1610, which may include a controller, to transmit and receive wireless signals. For example, processor 1610 may execute programs or applications stored in memory 1612 to control antenna 1616 to transmit and receive a wireless signal to and from a cellular network.

Display system 1618 may include any display system typically found in mobile devices (e.g., smartphones), such as a liquid crystal display (LCD), a touch screen display, or other suitable display device. Display system 1618 may be controlled to display textual and graphical information and output to text and graphics through a display device. When implemented with a touch screen display, the display system may receive input and transmit the input to processor 1610 and memory 1612.

Input devices 1620 provide a portion of a graphical user interface. Input devices 1620 may include an alpha-numeric keypad, such as a keyboard, or a touchscreen keypad for inputting alpha-numeric and other information, buttons or switches, a trackball, stylus, or cursor direction keys. Microphone 1622 may include one or more microphone devices which transmit captured acoustic signals to processor 1610 and memory 1612. The acoustic signals may be processed to transmit over a network via antenna 1616.

Speaker 1624 may provide an audio output for mobile device 1600. For example, a signal received at antenna 1616 may be processed by a program stored in memory 1612 and executed by processor 1610. The output of the executed program may be provided to speaker 1624, which then provides audio. Additionally, processor 1610 may generate an audio signal, for example an audible alert, and output the audible alert through speaker 1624.

The computing device system 1600 as shown in FIG. 16 may include devices and components in addition to those illustrated in FIG. 16. For example, system 1600 may include an additional network interface such as a universal serial bus (USB) port. The components contained in the computer system 1600 of FIG. 16 are those typically found in mobile device systems that may be suitable for use with some embodiments and are intended to represent a broad category of such mobile device components that are well-known in the art. Thus, the computer system 1600 of FIG. 16 may be a cellular phone, smart phone, hand-held computing device, laptop, minicomputer, netbook, or any other mobile computing device. The mobile device can also include different bus configurations, networked platforms, multi-processor platforms, etc. Various operating systems can be used including Unix, Linux, Windows, Macintosh Operating System (OS), Google OS, Palm OS, and other suitable operating systems.

The methods described herein may be executed by a processor of a computing device, such as that described above, and may be embodied on any number of non-transitory computer-readable storage media.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of transmitting bulk data over a mobile network, the method comprising:
    maintaining a database in memory of a server, the database including a table storing a plurality of records, each record corresponding to one of a plurality of input fields arranged as a predetermined fillable template and further corresponding to one of a plurality of report fields arranged as a predetermined report, wherein the predetermined report includes one or more feedback fields arranged as a predetermined feedback template;
    providing the predetermined fillable template to a mobile device associated with a first user to be displayed on a user interface of the mobile device, the mobile device communicatively coupled to the server by a mobile network and lacking a connection to a non-mobile communications network;
    receiving from the mobile device over the mobile network a plurality of short messages sent over Short Message Service (SMS), each SMS message representing data inputted by the first user into one of the plurality of input fields of the predetermined fillable template;
    correlating each received SMS message with a report field of the predetermined report based on the record corresponding to the input field of the predetermined fillable template;
    populating the predetermined report based on the determined correlation between each SMS message and each report field of the predetermined report;
    providing the predetermined report over a non-mobile communications network to a computing device associated with a second user to be displayed on a user interface of the computing device;
    receiving from the computing device over the non-mobile communications network a plurality of feedback SMS messages representing data inputted by the second user into one or more of the feedback fields of the predetermined feedback template;
    correlating each received feedback SMS message with a feedback field of a predetermined feedback report based on a record corresponding to the feedback field of the predetermined feedback template; and
    providing the predetermined feedback report at least partially over the mobile network to the mobile device associated with the first user.

2. The method of claim 1, further comprising sending to the computing device associated with the second user an alert notifying the second user that the first user has transmitted data over the mobile network by way of the predetermined report.

3. The method of claim 1, wherein the predetermined report includes a visual status indicator.

4. The method of claim 1, further comprising generating a visual status indicator based on at least one of the received SMS messages.

5. The method of claim 4, wherein generating the visual status indicator based on at least one of the received SMS messages includes comparing the received SMS messages to a plurality of predetermined trigger strings and matching the at least one received SMS message to at least one of the predetermined trigger strings.

6. The method of claim 3, wherein a visual status indicator on the predetermined report is a pop-up notification.

7. A non-transitory computer-readable storage medium having an executable computer program embodied thereon, the program executable by a processor of a computing device to perform a method of efficiently transmitting bulk data over a mobile network, the method comprising:
    maintaining a database in memory of a server, the database including a table storing a plurality of records, each record corresponding to one of a plurality of input fields arranged as a predetermined fillable template and further corresponding to one of a plurality of report fields arranged as a predetermined report, wherein the predetermined report includes one or more feedback fields arranged as a predetermined feedback template;

providing the predetermined fillable template to a mobile device associated with a first user to be displayed on a user interface of the mobile device, the mobile device communicatively coupled to the server by a mobile network and lacking a connection to a non-mobile communications network;

receiving from the mobile device over the mobile network a plurality of short messages sent over Short Message Service (SMS), each SMS message representing data inputted by the first user into one of the plurality of input fields of the predetermined fillable template;

correlating each received SMS message with a report field of the predetermined report based on the record corresponding to the input field of the predetermined fillable template;

populating the predetermined report based on the determined correlation between each SMS message and each report field of the predetermined report;

providing the predetermined report over a non-mobile communications network to a computing device associated with a second user to be displayed on a user interface of the computing device;

receiving from the computing device over the non-mobile communications network a plurality of feedback SMS messages representing data inputted by the second user into one or more of the feedback fields of the predetermined feedback template;

correlating each received feedback SMS message with a feedback field of a predetermined feedback report based on a record corresponding to the feedback field of the predetermined feedback template; and providing the predetermined feedback report at least partially over the mobile network to the mobile device associated with the first user.

8. The non-transitory computer-readable storage medium of claim 7, wherein the method further includes sending to the computing device associated with the second user an alert notifying the second user that the first user has transmitted data over the mobile network by way of the predetermined report.

9. The non-transitory computer-readable storage medium of claim 7, wherein the predetermined report includes a visual status indicator.

10. The non-transitory computer-readable storage medium of claim 7, the method further comprising generating a visual status indicator based on at least one of the received SMS messages.

11. The non-transitory computer-readable storage medium of claim 10, wherein generating the visual status indicator based on at least one of the received SMS messages includes comparing the received SMS messages to a plurality of predetermined trigger strings and matching the at least one received SMS message to at least one of the predetermined trigger strings.

12. The non-transitory computer-readable storage medium of claim 9, wherein a visual status indicator on the predetermined report is a pop-up notification.

13. A method of transmitting bulk data over a mobile network, the method comprising:

maintaining a database in memory of a server, the database including a table storing a plurality of records, each record corresponding to one of a plurality of input fields arranged as a predetermined fillable template and further corresponding to one of a plurality of report fields arranged as a predetermined report, wherein the predetermined report includes one or more feedback fields arranged as a predetermined feedback template;

providing the predetermined fillable template to a mobile device associated with a first user to be displayed on a user interface of the mobile device, the mobile device communicatively coupled to the server by a mobile network and lacking a connection to a non-mobile communications network;

receiving from the mobile device over the mobile network a plurality of short messages sent over Short Message Service (SMS), each SMS message representing data inputted by the first user into one of the plurality of input fields of the predetermined fillable template;

correlating each received SMS message with a report field of the predetermined report based on the record corresponding to the input field of the predetermined fillable template;

populating the predetermined report based on the determined correlation between each SMS message and each report field of the predetermined report;

providing the predetermined report over a non-mobile communications network to a computing device associated with a second user to be displayed on a user interface of the computing device; and generating a visual status indicator based on at least one of the received SMS messages comprising comparing the received SMS messages to a plurality of predetermined trigger strings and matching the at least one received SMS message to at least one of the predetermined trigger strings.

14. A non-transitory computer-readable storage medium having an executable computer program embodied thereon, the program executable by a processor of a computing device to perform a method of efficiently transmitting bulk data over a mobile network, the method comprising:

maintaining a database in memory of a server, the database including a table storing a plurality of records, each record corresponding to one of a plurality of input fields arranged as a predetermined fillable template and further corresponding to one of a plurality of report fields arranged as a predetermined report, wherein the predetermined report includes one or more feedback fields arranged as a predetermined feedback template;

providing the predetermined fillable template to a mobile device associated with a first user to be displayed on a user interface of the mobile device, the mobile device communicatively coupled to the server by a mobile network and lacking a connection to a non-mobile communications network;

receiving from the mobile device over the mobile network a plurality of short messages sent over Short Message Service (SMS), each SMS message representing data inputted by the first user into one of the plurality of input fields of the predetermined fillable template;

correlating each received SMS message with a report field of the predetermined report based on the record corresponding to the input field of the predetermined fillable template;

populating the predetermined report based on the determined correlation between each SMS message and each report field of the predetermined report;

providing the predetermined report over a non-mobile communications network to a computing device associated with a second user to be displayed on a user interface of the computing device;

receiving from the computing device over the non-mobile communications network a plurality of feedback SMS messages representing date inputted by the second user into one or more of the feedback fields of the predetermined feedback template; and
generating a visual status indicator based on at least one of the received SMS messages comprising comparing the received SMS messages to a plurality of predetermined trigger strings and matching the at least one received SMS message to at least one of the predetermined trigger strings.

\* \* \* \* \*

UNITED STATES PATENT AND TRADEMARK OFFICE
CERTIFICATE OF CORRECTION

PATENT NO.       : 9,648,474 B2
APPLICATION NO.  : 14/868299
DATED            : May 9, 2017
INVENTOR(S)      : Om Agrawal et al.

Page 1 of 1

It is certified that error appears in the above-identified patent and that said Letters Patent is hereby corrected as shown below:

In the Specification

Column 1, Line 8    Delete "Sep. 26, 2015",
                    Insert --Sep. 26, 2014--

Signed and Sealed this
Eleventh Day of September, 2018

Andrei Iancu
*Director of the United States Patent and Trademark Office*